United States Patent
Steffens et al.

(10) Patent No.: US 11,958,990 B2
(45) Date of Patent: *Apr. 16, 2024

(54) MIXER SYSTEM FOR PRODUCING AQUEOUS COATING MATERIALS WITH LOW VOC

(71) Applicant: BASF Coatings GmbH, Münster (DE)

(72) Inventors: Alexandra Steffens, Münster (DE); Bernhard Lettmann, Münster (DE); Josef Rademacher, Münster (DE); Peter Hoffmann, Münster (DE)

(73) Assignee: BASF COATINGS GMBH, Muenster (DE)

( * ) Notice: Subject to any disclaimer, the term of this patent is extended or adjusted under 35 U.S.C. 154(b) by 46 days.

This patent is subject to a terminal disclaimer.

(21) Appl. No.: 17/630,554

(22) PCT Filed: Jul. 15, 2020

(86) PCT No.: PCT/EP2020/070032
§ 371 (c)(1),
(2) Date: Jan. 27, 2022

(87) PCT Pub. No.: WO2021/018595
PCT Pub. Date: Feb. 4, 2021

(65) Prior Publication Data
US 2022/0251401 A1    Aug. 11, 2022

(30) Foreign Application Priority Data

Jul. 31, 2019  (EP) ..................... 19189314

(51) Int. Cl.
C09D 5/36      (2006.01)
C09D 7/20      (2018.01)
C09D 7/40      (2018.01)
C09D 7/80      (2018.01)
C09D 17/00     (2006.01)
C09D 133/06    (2006.01)
C09D 175/06    (2006.01)

(52) U.S. Cl.
CPC ................ C09D 5/36 (2013.01); C09D 7/20 (2018.01); C09D 7/70 (2018.01); C09D 7/80 (2018.01); C09D 17/001 (2013.01); C09D 17/006 (2013.01); C09D 133/066 (2013.01); C09D 175/06 (2013.01)

(58) Field of Classification Search
CPC ... C09D 5/36; C09D 7/20; C09D 7/70; C09D 7/80; C09D 17/001; C09D 17/006; C09D 133/066; C09D 175/06
See application file for complete search history.

(56) References Cited

U.S. PATENT DOCUMENTS 4,598,111 A    7/1986  Wright et al.
5,672,649 A    9/1997  Brock et al.
6,822,038 B1   11/2004 Gross et al.
7,932,317 B1   4/2011  Lettman
10,920,100 B2  2/2021  Corten et al.
2006/0293413 A1 12/2006 Sapper
2009/0281208 A1* 11/2009 Allard ....................... C09D 4/00
                                               524/588
2010/0255328 A1* 10/2010 Tomizaki ............... C09D 5/024
                                               428/483
2022/0259446 A1* 8/2022  Steffens ................ C09D 5/022

FOREIGN PATENT DOCUMENTS

DE    3412534 A1    10/1985
DE    3609519 A1    9/1987
DE    3731652 A1    4/1989
DE    3823005 A1    1/1990
DE    4110520 A1    10/1992
DE    4301991 A1    7/1994
DE    19921457 A1   11/2000
DE    19932497 A1   1/2001
EP    0468293 A1    1/1992
EP    0608773 A1    8/1994
EP    0614951 A2    9/1994

(Continued)

OTHER PUBLICATIONS

European Search Report for EP Patent Application No. 19189314.8, dated Mar. 2, 2020, 3 pages.
Hermann Römpp, "Römpp Lexikon, Lacke und Druckfarben", 1998, p. 176 and 451.
Krüger, et al., "Hydroxylzahlbestimmung an Polyetheralkoholen unter 4-Dimethylaminopyridin-Katalyse", Plaste und Kautschuk, vol. 5, 1982, p. 274.
International Search Report and Written Opinion for corresponding PCT/EP2020/070032 dated Nov. 30, 2020, 9 Pages.

*Primary Examiner* — Robert S Jones, Jr.
*Assistant Examiner* — Jiangtian Xu
(74) *Attorney, Agent, or Firm* — Armstrong Teasdale LLP

(57) ABSTRACT

Described herein is a mixer system for producing aqueous coating materials from at least one aqueous pigment paste A, including at least one effect pigment, and at least one pigment-free component B, including an aqueous, acrylate-based microgel dispersion having a glass transition temperature $T_g$ of 50 to 60° C., where both the aqueous pigment paste A and the component B each have a VOC value of less than or equal to 250 g/L. Further described herein is a method for producing aqueous coating materials having a VOC content of 0 to 250 g/L, in which the individual components A and B are stored separately and not mixed until shortly before application, to give the aqueous coating material. Further described herein is a method of using the mixer system of for producing aqueous coating materials for refinishing and/or for coating automobile bodies and/or plastics parts.

20 Claims, No Drawings

(56) References Cited

FOREIGN PATENT DOCUMENTS

| EP | 0706543 A1 | 4/1996 |
|---|---|---|
| WO | 9529960 A1 | 11/1995 |
| WO | 2005042656 A1 | 5/2005 |
| WO | 2017088988 A1 | 6/2017 |

\* cited by examiner

MIXER SYSTEM FOR PRODUCING AQUEOUS COATING MATERIALS WITH LOW VOC

CROSS-REFERENCE TO RELATED APPLICATIONS

This application is a U.S. National Phase Application of International Patent Application No. PCT/EP2020/070032, filed Jul. 15, 2020, which claims priority to European Patent Application No. 19189314.8, filed Jul. 31, 2019, the entire contents of which are hereby incorporated by reference herein.

The present invention relates to a mixer system for producing aqueous coating materials from at least one aqueous pigment paste A, comprising at least one effect pigment, and at least one pigment-free component B, comprising an acrylate-based microgel dispersion having a glass transition temperature $T_g$ of 50 to 60° C., where both the aqueous pigment paste A and the component B each have a VOC value of less than or equal to 250 g/L.

The present invention further relates to a method for producing aqueous coating materials having a VOC content of 0 to 250 g/L, more particularly of 100 to 250 g/L, in which the individual components A and B are stored separately and not mixed until shortly before application, to give the aqueous coating material.

The present invention lastly relates to the use of a mixer system of the invention for producing aqueous coating materials for refinishing and/or for the coating of automobile bodies and/or plastics parts.

STATE OF THE ART

Customary methods for repairing damage sites on a possibly multicoat paint system entail the careful cleaning and sanding, optionally spackling and filling, at the damage site. Subsequently, and optionally after a further pretreatment, the damage site is customarily sprayed with a hiding coat, which runs out into the bordering regions, of effect coating materials, such as metallic basecoat materials, for example, or with solid-color coating materials. After initial drying of the coating thus produced, a clearcoat material is sprayed over the coating and bordering parts, and, after any required flash-off time, the clearcoat coating is dried together with the previously applied coats, preferably at temperatures between 15 and 80° C.

Used customarily as effective coating materials and/or solid-color coating materials applied in a two-coat method, for the repair of damage sites, are low-solids coating materials which in addition to binders comprise color and/or effect pigments and also a high fraction of organic solvent mixtures.

The water-thinnable systems that are used in the production-line finishing sector cannot at present be used in the refinish sector, owing to the different requirements made of the systems in the two sectors. This is because the water-thinnable metallic basecoat materials that are used for production-line finishing (original vehicle finishing) lack sufficient storage stability for the refinish sector, since these water-thinnable coating materials are subject to problems of gassing stability (formation of hydrogen due to reaction between water and the aluminum bronze) and/or of effect stability. Both factors permanently detract from the shade and/or the lightness of the resultant coatings when viewed straight on. Furthermore, these systems usually comprise crosslinking agents, which are not employed in systems for refinish. In refinish, therefore, these systems have not been employed.

For economic reasons, to improve workplace safety (fire protection), and to reduce the environmental burden when drying the coating films, there are also concerns in the refinish sector to provide new coating compositions which have a lower VOC (volatile organic content) by comparison with the prior art, so that fewer VOC emissions occur during the production of corresponding multicoat paint systems, and the production can therefore be made more eco-friendly.

One way of lowering the VOC content is by raising the solids content of the coating compositions. By a switch from medium-solids basecoat systems with a solids content between 20-30% to so-called high-solids basecoat systems with a solids content greater than 35% in the application-ready state (and spray viscosity), it is possible to achieve a significant VOC reduction in the processing operation. Similar comments apply in respect of the use of high-solids clearcoats (clearcoat materials with a high solids content of up to 45% or more at spray viscosity).

Another way of lowering the VOC content is by using aqueous components for producing the coating material or composition.

Besides the aspect of the eco-friendliness, a matter of central importance is that, at the same time, other technological properties and also the esthetic properties of coating compositions, and of multicoat paint systems produced from them, are retained. Accordingly, the finished coating ought to be comparable, in visual and technological terms, with a baked original paint system, in spite of substantial differences in the boundary conditions.

In the sector of automotive refinish in particular, when repairing damage sites, it is important that the coating compositions used for the repair have the same or at least approximately the same shades as the coating from the production-line OEM finish, so that after refinishing it is not possible to perceive that any repair has taken place at all.

It is indeed possible in principle for the corresponding coating compositions to be supplied directly from the coatings manufacturer in the desired shade. A disadvantage of this, however, is that often only small amounts are needed for each repair, and yet the corresponding fully-formed coating compositions are often stable on storage at least not over a long period of time, such as a period of more than 12 months, for example. Such a procedure exhibits disadvantages on economic grounds.

It has therefore been found that it is advantageous for coating compositions to be produced individually, particularly in the automotive refinish sector. For this purpose, corresponding mixer systems, comprising various components, are provided, and these components are mixed with one another individually as and when required, to produce the corresponding coating composition. An advantage of this production from a mixer system is that there is no need for every shade to be individually produced and stocked, and therefore that costs of production, of distribution, and of warehousing can be lowered. It is essential in this case that the components of the mixer system have a sufficient storage stability (at least 12 months).

The laid-open specification DE 41 10 520 A1 discloses a mixer system which comprises various water-free base paints A and at least one water-containing, pigment-free component B. While the VOC content of the coating materials produced from this mixer system can be thereby reduced, the ready-to-spray coating material nevertheless still has a very high VOC content of 319 to 420 g/L.

Laid-open specification EP 1 183 313 A1 discloses a mixer system in which the effect pigment is present in a water-free base paint. This mixer system, moreover, also comprises aqueous base paints with color pigments, and an aqueous mixing varnish. Here as well, the water-free base paint comprising effect pigments has a very high VOC content.

The laid-open specifications EP 0 608 773 A1 and EP 0 706 543 A1 each disclose modular systems which comprise an effect module, containing at least 20 wt % of water, and an aqueous, pigment-free mixing varnish. This effect module also still has a relatively high solvent content.

The laid-open specification EP 0 614 951 A1 discloses a modular system which comprises a color module having at least 20 wt % of water, and an aqueous, pigment-free mixing varnish. This modular system, however, allows the production only of solid-color topcoat materials.

Furthermore, the laid-open specification EP 0 468 293 A1 describes aqueous coating materials based on various building blocks. It is necessary, however, for the effect building block to be water-free. Accordingly, the ready-to-use coating material also still always has a decidedly high VOC content of 330 to 340 g/L.

Problem and Solution

A problem addressed by the present invention, accordingly, was to provide a mixer system where all of the components of the mixer system have a VOC content of at most 250 g/L. This mixer system ought in particular to allow the production of aqueous coating materials suitable for refinishing, especially on damage sites on automobile bodies. The intention here was that a high shade accuracy of the aqueous coating materials should be ensured, in order thus to allow the desired shades to be established with the maximum accuracy and reproducibility, without costly and inconvenient measures for the paintshop. This means, on the one hand, that the aqueous pigment pastes used to construct this mixer system must have very good storage stability (>24 months). On the other hand, the aqueous coating materials are required to exhibit good metallic flop in the case of effect paint systems, and a cloud-free surface.

At the same time, the other properties of the coating, such as the adhesion to the original finish, for example, are not to be adversely affected. The adhesion problems are especially striking when the coated substrates are exposed to weathering. Consequently, the aqueous coating materials, even after having undergone weathering, ought still to possess outstanding adhesion properties. In particular, neither bubbles nor swelling ought to occur.

Solution to the Problem

The problems described above are solved by the subject matter claimed in the claims and also by the preferred embodiments of that subject matter that are described in the description hereinafter.

A first subject of the present invention, therefore, is a mixer system for producing aqueous coating materials, comprising (a) at least one aqueous pigment paste A comprising at least one effect pigment (a-1) and also at least one anionically stabilized binder (a-2) and/or at least one nonionically stabilized binder (a-3), and (b) at least one pigment-free component B comprising at least one acrylate-based microgel dispersion (b-1), the acrylate-based microgel having a glass transition temperature $T_g$ of 50 to 60° C., where the aqueous pigment paste A and the pigment-free component B each have a VOC value of less than or equal to 250 g/L.

The VOC value in this context is defined as follows: VOC (g/L)=(total weight of volatile constituents (g)−total weight of water (g))/(volume of coating material (L)−volume of water (L)). Volatile constituents for the present purposes are compounds which at processing temperature, especially at 20° C., have a vapor pressure of more than 10 pascals (cf. BImSchV 31 also corresponding VOC Directives and VOC Regulations of the EU). Furthermore, volatile constituents are organic compounds which have a starting boiling point of less than or equal to 250° C. under a standard pressure of 101.3 kPa (cf. Directive 2004/42/EC of the European Parliament and of the Council).

A further subject of the present invention is a method for producing aqueous coating materials having a VOC content of 0 to 250 g/L, more particularly of 100 to 250 g/L, by mixing at least two aqueous components, wherein a mixer system of the invention is used and the aqueous coating materials are produced by mixing the pigment paste A with the pigment-free component B and optionally with the component C.

The present invention relates, moreover, to the use of a mixer system of the invention for producing aqueous coating materials for refinishing and/or for coating of automobile bodies and/or plastics parts.

Not only the individual components of the mixer system of the invention but also the aqueous coating materials producible from the mixer system of the invention each have a VOC content of at most 250 g/L. To achieve such VOC contents, the components of the mixer system of the invention comprise predominantly water as their solvent, meaning that organic solvents are present only in small amounts. As well as economic advantages, this reduced solvent fraction leads to an improvement in workplace safety (fire protection) and to a reduction in the environmental burden associated with the drying of the coating films.

In spite of the low VOC content, the individual components of the mixer system of the invention exhibit excellent storage stability. Moreover, owing to the good effect particle orientation, a high shade accuracy is achieved. Furthermore, the aqueous coating materials exhibit good leveling, good spray mist absorption, and good hiding. Additionally, multicoat paint systems produced from the aqueous coating materials exhibit outstanding mechanical properties, in particular a good adhesion to the original finish and also a high condensation resistance and stonechip adhesion.

DETAILED DESCRIPTION

The mixer system of the invention comprises at least the components (a) and (b). A component here means storage-stable, separately storable building blocks (mixing building blocks), from which, by mixing, a fully formed aqueous coating material is produced, which optionally can still be adjusted to application viscosity. Through the mixing of the individual components, desired matchable colorations can be obtained.

The components may be provided to the user in the form, for example, of a kit comprising at least the components (a) and (b).

Different forms of each of the components (a) and (b) may be provided. In this way, series are formed, which may consist of one or more forms of the components (a) and (b). With particular preference, 1 to 100 different forms of component (a) and 1 to 6 different forms of component (b) are provided.

Furthermore, provision may also be made within the present invention for the mixer system of the invention to comprise further components. Embodiments of these kinds are set out following the description of the components (a) and (b).

Component (a)

Component (a) is an aqueous pigment based A comprising at least one effect pigment (a-1) and also at least one anionically stabilized binder (a-2) and/or at least one nonionically stabilized binder (a-3). The pigment paste A has a VOC content of less than or equal to 250 g/L.

The expression "aqueous pigment paste" is known to the skilled person. It refers fundamentally to a pigment paste which is not based exclusively on organic solvents. Indeed, a pigment paste of this kind based on organic solvents contains exclusively organic solvents and no water for dissolving and/or dispersing the components, or is a paste prepared not explicitly with addition of water; instead, water enters the paste only in the form of an impurity, atmospheric moisture, and/or as a solvent for any specific additives used. Such a paste—in contrast to an aqueous pigment paste—would be referred to as solvent-based or as "based on organic solvents". "Aqueous" in the context of the present invention is preferably to be understood to mean that the pigment paste in question has a water fraction of at least 20 wt %, preferably at least 25 wt %, very preferably at least 30 wt %, based in each case on the total amount of the solvents present (i.e., water and organic solvents). Preferably in turn, the water fraction is 60 to 100 wt %, more particularly 70 to 98 wt %, very preferably 75 to 95 wt %, based in each case on the total amount of the solvents present.

In relation to the term "binder", refer to Römpp-Lexikon Lacke and Druckfarben, Georg Thieme Verlag, Stuttgart, New York, 1998, pages 73 and 74, "Bindemittel".

To increase the dispersibility in an aqueous medium, the binder (a-2) comprises certain groups which can be converted by neutralizing agents in anionic groups (potentially anionic groups), and the binder (a-3) contains certain nonionic groups. These binders are referred to in the context of the present invention as anionically stabilized binders (a-2) and, respectively, nonionically stabilized binders (a-3). The anionic groups which can be converted into anionic groups by neutralizing agents are, for example, carboxylic, sulfonic and/or phosphonic acid groups, especially carboxylic acid groups. Groups for the nonionic stabilization are preferably poly(oxyalkylene) groups, more particularly poly(oxyethylene) and/or poly(oxypropylene) groups.

Effect Pigment (a-1):

Effect pigments (a-1) are those pigments which produce a decorative effect in coating finishes and may additionally, but not exclusively, produce a coloring effect. The effect pigments are notable in particular for a platelet-like construction. Such effect pigments are known to those skilled in the art and are described, for example, in Römpp-Lexikon Lacke and Druckfarben, Georg Thieme Verlag, Stuttgart, New York, 1998, pages 176 and 451.

Preferred effect pigments (a-1) are, for example, platelet-shaped metallic effect pigments such as platelet-shaped aluminum pigments, gold bronzes, oxidized bronzes and/or iron oxide-aluminum pigments, pearlescent pigments and/or metal oxide-mica pigments and/or other effect pigments such as platelet-shaped graphite, platelet-shaped iron oxide, multilayer effect pigments composed of PVD films and/or liquid crystal polymer pigments. Particularly preferred are platelet-shaped metallic effect pigments, especially platelet-shaped aluminum pigments and/or coated metal oxide-mica pigments.

A multiplicity of these effect pigments are available on the market, and differ in particle size, particle size distribution, and particle morphology. The pigments are selected according to the desired effect in the coating film. Within the present invention it is possible for the aqueous pigment pastes to contain only one effect pigment (a-1) or else a mixture of different effect pigments (a-1).

Surprisingly it has been found in the context of the invention that the aqueous pigment pastes A may also comprise metallic pigments composed of water-sensitive metals, such as aluminum or steel, without significant reduction in the storage stability of these pastes and without detriment to the metallic effect of the aqueous coating material. It has been found that this is possible especially when passivated, water-sensitive metals are used in the aqueous pigment pastes A in combination with an anionically stabilized binder (a-2) and/or a nonionically stabilized binder (a-3).

Besides the at least one effect pigment (a-1), the aqueous pigment pastes A may further comprise at least one inorganic and/or organic color pigment and/or a filler. Examples of inorganic color pigments or fillers are white pigments such as titanium dioxide; black pigments such as carbon black, iron manganese black or spinel black; chromatic pigments such as ultramarine green, ultramarine blue or manganese blue, ultramarine violet or manganese violet, red iron oxide, molybdate red or ultramarine red; brown iron oxide, mixed brown, spinel phases and corundum phases; or yellow iron oxide or bismuth vanadate. Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. In accordance with the invention, however, the aqueous pigment pastes A contain preferably 0 wt % of color pigments and/or fillers, based on the total weight of the aqueous pigment paste A.

The effect pigment (a-1) is used preferably in certain total amounts. More preferably the aqueous pigment paste A comprises the at least one effect pigment (a-1) in a total amount of 5 to 35 wt %, preferably of 6 to 30 wt %, based on the total weight of the aqueous pigment paste A.

Binders:

The aqueous pigment paste A comprises at least one anionically stabilized binder (a-2) and/or at least one nonionically stabilized binder (a-3). These binders are preferably present in a certain total amount. The aqueous pigment paste preferably comprises the at least one anionically stabilized binder (a-2) and/or the at least one nonionically stabilized binder (a-3), more particularly a mixture of the anionically stabilized binder (a-2) described below and the nonionically stabilized binder (a-3) described below, in a total amount of 5 to 35 wt %, preferably of 10 to 30 wt %, more particularly of 11 to 25 wt %, based in each case on the total weight of the aqueous pigment paste A. If there is more than one anionically stabilized binder (a-2) and/or one nonionically stabilized binder (a-3) present, then these total amounts are based on the sum of the amount of all the anionically and nonionically stabilized binders used. The total amounts recited above permit a stable dispersion of the effect pigment (a-1) and any further color pigments and/or fillers, thus giving the aqueous pigment paste A high stability on storage. Moreover, these binders lead to high mechanical stability on the part of the aqueous coating materials produced from these pastes. A good effect particle orientation further occurs in the aqueous coating materials, and hence a good metallic effect. Moreover, these binders ensure high freeze-thaw stability on the part of the aqueous pigment paste A.

Anionically Stabilized Binder (a-2):

With preference in accordance with the invention, certain anionically stabilized binders (a-2) are used. In order to achieve the above-described low VOC content of the aqueous pigment paste A, particular preference is given to using anionically stabilized binders dispersed in water.

In one preferred embodiment of the first subject of the invention, therefore, the anionically stabilized binder (a-2) of the pigment paste A is an anionically stabilized polyurethane polymer in dispersion in water, where the anionically stabilized polyurethane polymer has an acid number of 20 to 40 mg KOH/g, based on the solids content, where the dispersion has a pH of 7.0 to 8.0, and where the dispersion comprises a polyol, more particularly polypropylene glycol, having an average molar mass $M_n$ of 500 to 1500 Da.

The anionically stabilized polyurethane polymers are obtainable by the action of a prepolymer containing isocyanate groups with compounds that are reactive toward isocyanate groups, as described for example in the laid-open specification DE 199 21 457 A1. This reaction of the components takes place in accordance with the well-known methods of organic chemistry (cf., e.g., Kunststoff-Handbuch, Volume 7: Polyurethane, edited by Dr. Y. Oertel, Carl Hanser Verlag, Munich, Vienna 1983).

The reaction of the components takes place preferably in the customary and known organic solvents. The amount of organic solvents in this case may vary within wide limits, and ought to be sufficient to form a prepolymer solution with suitable viscosity. Generally speaking, up to 70 wt %, preferably 5 to 50 wt %, and more preferably less than 20 wt % of solvents are used, based on the solids content. Accordingly, for example, the reaction may be carried out with very particular preference at a solvent content of 10-15 wt %, based on the solids content.

The reaction of the components may optionally take place in the presence of a catalyst, such as organotin compounds and/or tertiary amines.

Prepolymers containing isocyanate groups may be prepared by reaction of polyols having a hydroxyl number of 10 to 1800, preferably 50 to 1200 mg KOH/g, with excess polyisocyanates at temperatures of up to 150° C., preferably 50 to 130° C., in organic solvents which cannot react with isocyanates. The equivalents ratio of NCO groups to OH groups is between 2.0:1.0 and >1.0:1.0, preferably between 1.4:1 and 1.1:1.

The polyols used for preparing the NCO prepolymer may be of low and/or high molecular weight, and contain at least one anionic group or group capable of forming anions. Use may additionally be made of low molecular weight polyols having a molecular weight of 60 up to 400 daltons, for preparing the prepolymers containing isocyanate groups.

To obtain an NCO prepolymer of high flexibility, a high fraction of a predominantly linear polyol having a preferred OH number of 30 to 150 mg KOH/g ought to be added. Up to 97 wt % of the total polyol may consist of saturated and unsaturated polyesters having a number-average molecular weight $M_n$ of 400 to 5000 daltons. Polyesterdiols are prepared by esterification of organic dicarboxylic acids or their anhydrides with organic diols, or derive from a hydroxycarboxylic acid or a lactone.

Particular preference is given to using a linear polyester which is obtainable by reaction of aliphatic and aromatic dicarboxylic acids with aliphatic diols.

Besides the polyester, further polyols are used for preparing the NCO prepolymer, with at least one polyol containing carboxylic, sulfonic acid and/or phosphonic acid groups. Preferred for use are alkanoic acids having two hydroxyl groups on the alpha carbon atom. These polyols have at least one, generally 1 to 3, carboxyl groups in a molecule. They have two to about 25, preferably 3 to 10, carbon atoms. The polyol containing carboxyl groups may make up to 3 to 100 wt %, preferably 5 to 50 wt %, of the entire polyol constituent in the NCO prepolymer.

The amount of ionizable carboxyl groups that is available through the carboxyl group neutralization in salt form is at least 0.4 wt %, preferably at least 0.7 wt %, based on the solids of the NCO prepolymer. The upper limit is about 12 wt %. The amount of dihydroxyalkanoic acids in the unneutralized prepolymer produces an acid number of 10 mg KOH/g to 40 mg KOH/g.

Further polyols, which contain no carboxyl, sulfonic acid and/or phosphonic acid groups, are preferably selected from diols of the formula (1)

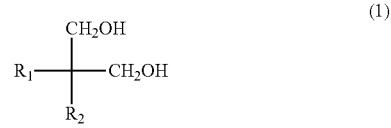

in which $R_1$ and $R_2$ each represent an identical or different radical and are an alkyl radical having 1 to 18 carbon atoms, an aryl radical or a cycloaliphatic radical.

Particularly preferred diols of the formula (1) are diols in which $R_1$ and $R_2$ are each a methyl radical.

The diols of formula (1) are used customarily in an amount of 0.5 to 15 wt %, preferably 1 to 7 wt %, based in each case on the total weight of the synthesis components used for preparing the anionically stabilized polyurethane polymers.

Typical polyfunctional isocyanates used for preparing the anionically stabilized polyurethane polymers are aliphatic, cycloaliphatic and/or aromatic polyisocyanates having at least two isocyanate groups per molecule. The isomers or isomer mixtures of organic diisocyanates are preferred. On account of their high stability toward ultraviolet light, (cyclo)aliphatic diisocyanates give rise to products with little yellowing tendency. The polyisocyanate component used to form the prepolymer may also include a fraction of polyisocyanates of higher functionality, provided that this does not cause any gelling. Established triisocyanates are products formed by trimerization or oligomerization of diisocyanates or by reaction of diisocyanates with polyfunctional compounds containing OH or NH groups. The average functionality may optionally be lowered by addition of monoisocyanates.

Examples of polyisocyanates which can be used are phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate, cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate, ethylethylene diisocyanate, and trimethylhexane diisocyanate.

For producing high-solids, anionically stabilized polyurethane polymer dispersions, use is made in particular of diisocyanates of general formula (2),

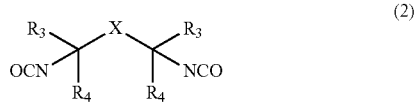

where X is a divalent cyclic and optionally aromatic hydrocarbon radical, preferably an optionally halogen-, methyl or methoxy-substituted dicyclohexylmethyl, naphthylene, diphenylene or 1,2-, 1,3- or 1,4-phenylene radical, more preferably a dicyclohexylmethyl radical, and $R_3$ and $R_4$ are hydrogen or an alkyl radical having 1-4 carbon atoms, preferably hydrogen. One diisocyanate of the formula (2) that is used with particular preference in the context of the present invention is 4,4'-methylenedicyclohexyl diisocyanate (also referred to as $H_{12}MDI$).

The NCO prepolymer contains at least 0.5 wt % of isocyanate groups, preferably at least 1 wt % of NCO, based on the solids. The upper limit is 15 wt %, preferably 10 wt %, more preferably 5 wt % of NCO.

The isocyanate groups of the prepolymer containing isocyanate groups are reacted with a modifier or chain extender. The modifier in that case is added preferably in an amount such that there are chain extensions and hence increases in molecular weight. Modifiers used are preferably organic compounds which contain hydroxyl and/or secondary and/or primary amino groups, more particularly polyols and/or polyamines having a functionality of two, three and/or more. Examples of polyamines which can be used are ethylenediamine, trimethylenediamine, tetramethylenediamine, pentamethylenediamine, hexamethylenediamine or diethylenetriamine. Examples of polyols which can be used are trimethylolpropane, 1,3,4-butanetriol, glycerol, erythritol, mesoerythritol, arabitol, adonitol, etc. Preference is given to using trimethylolpropane. The equivalents ratio of the prepolymer to the modifier is preferably between 2.0:1.0 and 1.0:2.0, more particularly between 1.1:1 and 1:1.1.

In the context of the present invention, the anionically stabilized polyurethane polymer is obtainable with particular preference by reaction of a NCO prepolymer with a modifier in the form of a polyol, especially trimethylolpropane, the NCO prepolymer being obtainable by reaction of
(i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, with the polyester polyol preferably containing no olefinic double bonds,
(ii) 3 to 7 wt %, based on the total weight of the compounds (i) to (iv), of at least one alkanoic acid having 3 to 8 carbon atoms and also two hydroxyl groups on the alpha carbon atom, especially dimethylolpropionic acid,
(iii) 0.5 to 3 wt %, based on the total weight of the compounds (i) to (iv), of at least one polyol of the formula (1) where $R_1=R_2=$methyl, and
(iv) 25 to 30 wt %, based on the total weight of the compounds (i) to (iv), of at least one diisocyanate of the formula (2) where X=dicyclohexylmethyl radical and $R_3=R_4=$hydrogen.

The equivalents ratio of the prepolymer to the modifier is preferably between 2.0:1.0 and 1.0:2.0, especially between 1.1:1 and 1:1.1.

It is an advantage in accordance with the invention if the anionically stabilized polyurethane polymer has a number-average molecular weight $M_n$ of 750 to 2 000 000, preferably 750 to 1 000 000, more preferably 750 to 500 000, and more particularly 950 to 15 000 daltons, an acid number of 5 to 150, preferably 10 to 100, more preferably 15 to 80, and more particularly 20 to 35 mg KOH/g, and an OH number of 1 to 150, preferably 2 to 100, more preferably 5 to 70, and especially 10 to 25 mg KOH/g.

The anionically stabilized polyurethane polymer is neutralized with a base, preferably with an organic base, more particularly with N,N'-dimethylethanolamine, the base being added in an amount such that a degree of neutralization of 50% to 100%, preferably of 60% to 80%, is achieved. As a result of the addition of the base, the dispersion has a pH of 7.0 to 8.0.

To facilitate the dispersing of the partially neutralized anionically stabilized polyurethane polymer in water, an alkylene glycol is added, preferably propylene glycol, having an average molar mass $M_n$ of 800 to 1500 Da.

The anionically stabilized binder (a-2), especially the above-described anionically stabilized polyurethane polymer, is present in the aqueous pigment paste A preferably in certain total amounts. The aqueous pigment paste A preferably comprises the at least one anionically stabilized binder (a-2), preferably the above-described anionically stabilized polyurethane polymer, in a total amount of 5 to 30 wt %, preferably of 10 to 25 wt %, more particularly of 11 to 20 wt %, based in each case on the total weight of the aqueous pigment paste A. Where different anionically stabilized binders (a-2) are used, the sum of all anionically stabilized binders (a-2) corresponds to the total amounts indicated above. With preference in accordance with the invention, the aqueous pigment paste A comprises only a single anionically stabilized binder (a-2), and therefore no mixture of different anionically stabilized binders is used. The use of the anionically stabilized binder (a-2), especially of the aqueous, anionically stabilized polyurethane polymer dispersion, as the sole anionically stabilized binder, in aqueous pigment paste A leads to outstanding stabilization of the effect pigments and hence to a high storage stability of the pigment pastes.

Nonionically Stabilized Binder (a-3):

Instead of the anionically stabilized binder (a-2), the aqueous pigment paste A may also comprise at least one nonionically stabilized binder (a-3). In one preferred embodiment, the aqueous pigment paste A comprises a mixture of an anionically stabilized binder (a-2), especially of the above-described anionically stabilized polyurethane polymer, and a nonionically stabilized binder (a-3).

Particularly preferred nonionically stabilized binders (a-3) are selected from nonionically stabilized acrylate copolymers in dispersion in water, with the acrylate copolymers comprising monomer units having anchor groups for interaction and stable dispersion of effect pigments (a-1), and also monomer units having hydrophilic sections for stabilization of the nonionically stabilized acrylate copolymer in aqueous solution. It is therefore preferred in accordance with the invention if the nonionically stabilized binder (a-3) of the pigment paste A is a nonionically stabilized acrylate copolymer in dispersion in water, the nonionically stabilized acrylate copolymer being obtainable by reaction of
(I) at least one anchor group monomer unit having at least one ionizable functional group, a functional group with active hydrogen, or a combination thereof, where the ionizable functionality is other than a carboxylic acid group in which the carbonyl carbon is separated from the closest ethylenically unsaturated carbon by at least four atoms, the anchor group monomer units (a) contain no polyoxyalkylene groups, and one of the anchor group monomer units is copolymerized 1-(2-methacryloyloxyethyl)-2-imidazolidinone;

(II) 5 wt % to 45 wt %, based on the total weight of the monomers, of at least one monomer unit comprising a polyoxyalkylene group, a gamma-hydroxycarbamate group, a beta-hydroxycarbamate group, and a combination thereof; and (III) 1 to 50 weight percent, based on the total weight of the monomers, of at least one aromatic monomer unit.

Suitable monomers for the anchor group monomer unit (I) are selected from the group of (meth)acrylic acid, ethacrylic acid, crotonic acid, maleic acid and monoesters thereof, fumaric acid and monoesters thereof, itaconic acid and monoesters thereof, vinylbenzoic acid, alpha-methylvinylbenzoic acid, p-vinylbenzenesulfonic acid or p-vinylbenzenephosphonic acid, mono(meth)acryloyloxyethyl maleate, succinate or phthalate, amine-containing ethylenically unsaturated monomers, such as tert-butylaminoethyl (meth)acrylate, dimethylaminoethyl (meth)acrylate, dimethylaminoethyl (meth)acrylate, N,N-dimethylaminopropyl(meth)acrylamide, N, N-diethylamino-alpha-methylstyrene, N, N-diethylaminostyrene, allylamine, crotylamine, glycidyl (meth)acrylate or other glycidyl-containing ethylenically unsaturated monomers in which the glycidyl group is reacted with monoamines such as cyclohexylamine before, during or after the polymerization, amino acids, hydroxyl-functional ethylenically unsaturated monomers such as hydroxyethyl (meth)acrylate, hydroxypropyl (meth)acrylate, and hydroxybutyl (meth)acrylate, esters of epsilon-caprolactone and hydroxyalkyl (meth)acrylates such as the commercially available monomer Tone 100M (from Dow Chemicals), acrylamide, methacrylamide, carbamatoalkyl (meth)acrylates, carbamyloxyalkyl (meth)acrylates such as 2-carbamyloxyethyl methacrylate and 4-carbamyloxybutyl acrylate, monomers with alkoxysilane or silanol functionalization such as triethoxysilane, ethylenically unsaturated monomers having urea groups or hydrazine groups, such as 2-(2-oxo-1-imidazolidinyl)ethyl (meth)acrylate, and also suitable mixtures. More preferably the anchor group monomer unit (I) is selected from hydroxyethyl (meth)acrylate, N,N-dimethylaminopropyl(meth)acrylamide, 2-(2-oxo-1-imidazolidinyl)ethyl (meth)acrylate, and mixtures of these monomers.

Suitable examples of monomer units (II) are selected from β-carboxyethyl acrylate, monomethacryloyloxyethyl hexahydrophthalate, Ω-methyloxy-polyoxyethylene (meth)acrylates, and Ω-methyloxypoly(oxyethylene-co-oxypropylene)(meth)acrylates having molecular weights of 1000 to 3000 Da. Used more preferably as monomer unit (II) is Ω-methyloxy-polyoxyethylene (meth)acrylate, the amount of this monomer being 5 to 50 wt %, from 10 to 40 wt %, more particularly 15 to 35 wt %, based on the total amount of monomers. The amount of stabilizer monomer units indicated above ensures that on the one hand the nonionically stabilized acrylate copolymer has sufficient dispersibility in water, but on the other hand that the water resistance of the aqueous coating materials is not adversely affected.

Preferred aromatic monomer units (III) are selected from vinylaromatic compounds, such as styrene, α-methylstyrene, vinyltoluene, t-butylstyrene, and mixtures thereof. The aromatic monomer units (III) are used preferably in a total amount of 15 to 25 wt %, based on the total weight of the monomers. Styrene is used more preferably in a total amount of 15 to 25 wt %, based on the total weight of the monomers.

Besides the above-recited monomers (I) to (III), further ethylenically unsaturated nonionic monomers may be used for preparing the acrylate polymer. Such monomers are selected for example from the group of esters of acrylic acid, methacrylic acid, and crotonic acid, monoesters and diesters of α,β-ethylenically unsaturated dicarboxylic acids with 4 to 6 carbon atoms, vinyl esters, vinyl ethers, vinyl ketones, and heterocyclic aliphatic vinyl compounds. Suitable esters of acrylic acid, methacrylic acid, and crotonic acid are, for example, methyl, ethyl, propyl, isopropyl, n-butyl, isobutyl, tert-butyl, hexyl, 2-ethylhexyl, dodecyl, cyclohexyl, isobornyl, lauryl, and stearyl esters of acrylic acid, methacrylic acid, and crotonic acid. Further examples are monoesters of fumaric acid, maleic acid and itaconic acid, and also diesters thereof with alcohols such as methanol, ethanol, propanol, isopropanol, butanol, isobutanol, and tert-butanol. Further suitable monomers are vinyl acetate, vinyl propionate, vinyl ethers such as vinyl ethyl ether, vinyl halides and vinylidene halides, vinyl ethyl ketone, and 2-vinylpyrrolidone. With particular preference alkyl esters of acrylic acid and methacrylic acid, especially butyl acrylate and methyl methacrylate, are used as further monomers.

The nonionically stabilized acrylate copolymer may be prepared by known methods, such as bulk or solution polymerization. The polymerization may be carried out as a volatile radical polymerization. The free radicals are provided typically by a redox initiator or an organic peroxo or azo compound. Suitable initiators are selected from the group of ammonium peroxydisulfate, potassium peroxydisulfate, sodium metabisulfite, hydrogen peroxide, tert-butyl hydroperoxide, dilauryl peroxide, tert-butyl peroxybenzoate, tert-butyl per-2-ethylhexanoate, di-tert-butyl peroxide, 2,2'-azobis(isobutyronitrile), 2,2'-azobis(isovaleronitrile), and also redox initiators such as ammonium peroxydisulfate and sodium metabisulfite with iron (II) ammonium sulfate. Moreover, the polymerization may be carried out as an anionic, cationic, and controlled radical polymerization.

The nonionically stabilized acrylate copolymer preferably has a weight-average molecular weight $M_w$ of 8000 to 70 000 Da, the molecular weight $M_w$ being determined by gel permeation chromatography using polymethyl methacrylate as a standard. The glass transition temperature $T_g$ of the nonionically stabilized acrylate copolymer is preferably from −30 to 180° C., more particularly from 0 to 120° C. and may be determined using differential scanning calorimetry (DSC).

Used more preferably are nonionically stabilized acrylate copolymers (a-3) in dispersion in water, the nonionically stabilized acrylic copolymer being obtainable by reaction of (I) 25 to 35 wt %, based on the total weight of the monomers, of hydroxyl-functional ethylenically unsaturated monomers, ethylenically unsaturated monomers having urea groups, amine-containing ethylenically unsaturated monomers, and mixtures thereof, more particularly a mixture of hydroxyethyl (meth)acrylate, N,N'-dimethylaminopropylacrylamide, and 2-(2-oxo-1-imidazolidinyl)ethyl (meth)acrylate, (II) 25 wt % to 35 wt %, based on the total weight of the monomers, of Ω-methyloxy-polyoxyethylene (meth)acrylate, (III) 15 to 25 wt %, based on the total weight of the monomers, of vinylaromatic compounds, more particularly styrene, and (IV) 15 to 25 wt %, based on the total weight of the monomers, of $C_1$-$C_{10}$ alkyl acrylates and $C_1$-$C_{10}$ alkyl methacrylates, more particularly n-butyl acrylate and methyl methacrylate.

The nonionically stabilized binder (a-3), more particularly the above-described nonionically stabilized acrylate copolymer, is present in the aqueous pigment paste A preferably in certain total amounts. The aqueous pigment paste A preferably comprises the at least one nonionically stabilized binder (a-3), more particularly the above-described nonionically stabilized acrylate copolymer, in a total amount of 0.1 to 12 wt %, preferably of 0.3 to 6 wt %, more particularly of 0.3 to 3 wt %, based in each case on the total weight of the aqueous pigment paste A. Where different nonionically stabilized binders (a-3) are used, the sum of all the nonionically stabilized binders (a-3) corresponds to the total amounts indicated above. With preference in accordance with the invention, the aqueous pigment paste A comprises only a single nonionically stabilized binder (a-3), and therefore no mixture of different nonionically stabilized binders (a-3) is used. The use of the nonionically stabilized binder (a-3), especially of the nonionically stabilized acrylate copolymer dispersion in water, as the sole nonionically stabilized binder (a-3), in aqueous pigment paste A leads to outstanding stabilization of the effect pigments and hence to a high storage stability and also freeze-thaw stability of the pigment pastes.

In the context of the present invention it is advantageous if the aqueous pigment paste A comprises a certain weight ratio of nonionically stabilized binder (a-3) to anionically stabilized binder (a-2). It is therefore preferred in accordance with the invention if the at least one pigment paste A comprises a weight ratio of the total amount of nonionically stabilized binder (a-3) to the total amount of anionically stabilized binder (a-2) of 1:5 to 1:36, more particularly of 1:5 to 1:13, based in each case on the solids content. With particular preference, anionically stabilized binder (a-2) comprises the aforesaid aqueous dispersion of the anionically stabilized polyurethane polymer, and as nonionically stabilized binder (a-3) comprises the above-described aqueous dispersion of the nonionically stabilized acrylate copolymer. The use of the binders in the weight ratios recited above results in outstanding stabilization of the effect pigments and ensures a good effect particle orientation in the aqueous coating materials. As a result, a good metallic effect and hence also high shade accuracy are achieved. Furthermore, a high freeze-thaw stability is achieved.

The aqueous pigment paste A has a VOC content of less than or equal to 250 g/L. To achieve this VOC content, the aqueous pigment paste A ought to include as little organic solvents as possible. In one particularly preferred embodiment of the first subject of the invention, therefore, the at least one pigment paste A comprises organic solvent in a total amount of 0 to 10 wt %, preferably of 0 to 9.5 wt %, more particularly of 0 to 9 wt %, based in each case on the total weight of the aqueous pigment paste A. The term "organic solvent" refers to volatile compounds which at 20° C. have a vapor pressure of more than 10 pascals and/or which possess an initial boiling point of less than or equal to 250° C. at a standard pressure of 101.3 kPa.

Further Constituents:

The at least one aqueous pigment paste A may further comprise other customary additives, such as crosslinking agents, coatings additives, thickeners, and radiation-curable constituents. Suitable further constituents are listed for example in DE 199 21 457 A1.

The aqueous pigment paste A is generally prepared by initially introducing the anionically stabilized binder (a-2) and mixing it with water, additives, pigment, or a paste of the effect-imparting and optionally color-imparting pigment (a-1) in solvent. Then the nonionically stabilized binder (a-3) is added, and mixing is repeated. In the case of plated-shaped effect pigments, care should be taken not to damage them during mixing.

The aqueous pigment paste A of the invention exhibits an outstanding freeze-thaw stability. By contrast, aqueous pigment pastes which contain no anionically and/or nonionically stabilized binder, more particularly no aforementioned anionically stabilized binder (a-2) and nonionically stabilized binder (a-3), do not have an adequate freeze-thaw stability.

Particularly preferred embodiments AF1 to AF12 of the aqueous pigment paste A are shown below (all quantities are based on the total weight of the aqueous pigment paste A; where dispersions are used, all quantities are based on the solids content of the dispersions within the total weight of the aqueous pigment paste A).

AF1: Aqueous pigment paste A, containing 6 to 30 wt % of at least one effect pigment (a-1) and also at least one nonionically stabilized binder (a-3).

AF2: Aqueous pigment paste A, containing 6 to 30 wt % of at least one effect pigment (a-1) and also 0.3 to 3 wt % of at least one nonionically stabilized binder (a-3).

AF3: Aqueous pigment paste A, containing 6 to 30 wt % of at least one effect pigment (a-1) and also at least one anionically stabilized binder (a-2).

AF4: Aqueous pigment paste A, containing 6 to 30 wt % of at least one effect pigment (a-1) and also 11 to 20 wt % of at least one anionically stabilized binder (a-2).

AF5: Aqueous pigment paste A, containing at least one effect pigment (a-1), especially 6 to 30 wt % of at least one effect pigment, and also at least one anionically stabilized binder (a-2) and at least one nonionically stabilized binder (a-3).

AF6: Aqueous pigment paste A, containing 6 to 30 wt % of at least one effect pigment (a-1) and also 0.3 to 3 wt % of at least one nonionically stabilized binder (a-3) and 11 to 20 wt % of at least one anionically stabilized binder (a-2).

AF7: Aqueous pigment paste A, containing a weight ratio of the total amount of nonionically stabilized binder (a-3) to the total amount of anionically stabilized binder (a-2) of 1:5 to 1:36, especially of 1:5 to 1:13, based in each case on the solids content.

AF8: Aqueous pigment paste A according to any of embodiments AF1 to AF7, further comprising at least one color pigment and/or one filler.

AF9: Aqueous pigment paste A according to any of embodiments AF1, AF2, and AF5 to AF8, where the nonionically stabilized binder (a-3) is a nonionically stabilized acrylate copolymer in dispersion in water, and where the nonionically stabilized acrylate polymer is obtainable by reaction of (I) 25 to 35 wt %, based on the total weight of the monomers, of hydroxyl-functional ethylenically unsaturated monomers, ethylenically unsaturated monomers having urea groups, amine-containing ethylenically unsaturated monomers, and mixtures thereof, more particularly a mixture of hydroxyethyl (meth)acrylate, N,N'-dimethylaminopropylacrylamide, and 2-(2-oxo-1-imidazolidinyl) ethyl (meth)acrylate, (II) 25 wt % to 35 wt %, based on the total weight of the monomers, of Ω-methyloxy-polyoxyethylene (meth)acrylate, (III) 15 to 25 wt %, based on the total weight of the monomers, of vinylaromatic compounds, more particularly styrene, and (IV) 15 to 25 wt %, based on the total weight of the monomers, of $C_1$-$C_{10}$ alkyl acrylates and $C_1$-$C_{10}$ alkyl methacrylates, more particularly n-butyl acrylate and methyl methacrylate.

AF10: Aqueous pigment paste A according to embodiment AF9, where the nonionically stabilized acrylate copolymer has a weight-average molecular weight $M_w$ of 8000 to 70 000 Da and a glass transition temperature $T_g$ of −30 to 180° C., especially of 0 to 120° C.

AF11: Aqueous pigment paste A according to any of embodiments AF3 to AF8, where the anionically stabilized binder (a-2) has a number-average molecular weight $M_n$ of 750 to 2 000 000, preferably 750 to 1 000 000, more preferably 750 to 500 000 and more particularly 950 to 15 000 daltons, an acid number of 5 to 150, preferably 10 to 100, more preferably 15 to 80, and especially 20 to 35 mg KOH/g, and an OH number of 1 to 150, preferably 2 to 100, more preferably 5 to 70, and especially 10 to 25 mg KOH/g.

AF12: Aqueous pigment paste A according to any of embodiments AF3 to AF8 and also AF11, where the anionically stabilized binder (a-2) is an anionically stabilized polyurethane polymer in dispersion in water, where the anionically stabilized polyurethane polymer is obtainable by reaction of an NCO prepolymer with a modifier in the form of a polyol, especially trimethylolpropane, in an equivalents ratio of NCO prepolymers to modifier of 1.1:1 to 1:1.1, and where the NCO prepolymer is obtainable by reaction of (i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, with the polyester polyol preferably containing no olefinic double bonds, (ii) 3 to 7 wt %, based on the total weight of the compounds (i) to (iv), of at least one alkanoic acid having 3 to 8 carbon atoms and also two hydroxyl groups on the alpha carbon atom, especially dimethylolpropionic acid, (iii) 0.5% to 3% by weight based on the total weight of the compounds (i) to (iv), of at least one polyol of the formula (1);

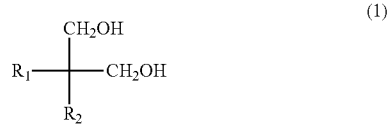

where $R_1$=$R_2$=methyl, and (iv) 25% to 30 wt %, based on the total weight of the compounds (i) to (iv), of at least one diisocyanate of the formula (2)

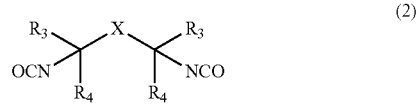

where X=dicyclohexylmethyl radical and $R_3$=$R_4$=hydrogen.

The above-recited embodiments AF1 to AF12 of the aqueous pigment paste A exhibit stable dispersion of the pigments contained, and therefore possess a high storage stability. Moreover, as a result of the stable dispersion, a good metallic effect, high shade accuracy and also good hiding are achieved. Furthermore, the use of nonionically and/or anionically stabilized binders, especially the above-recited specific binders, leads to good mechanical properties, more particularly good adhesion on the original finish, high condensation resistance, and good stonechip adhesion, of the aqueous coating materials. In addition an outstanding freeze-thaw stability is achieved.

Component (b)

Component (b) is a pigment-free component B which comprises at least one acrylate-based microgel dispersion (b-1), the microgel having a glass transition temperature $T_g$ of 50 to 60° C. Component B as well has a VOC content of less than or equal to 250 g/L.

"Pigment-free" in the context of the present invention means that component B comprises no effect pigments, color pigments, and fillers. Preferably, therefore, in component B there is 0 wt %, based on the total weight of component B, of effect pigments, color pigments, and fillers.

Aqueous, Acrylate-Based Microgel Dispersion (b-1):

Microgel dispersions, also called latex in the prior art, are known fundamentally. It is a polymer dispersion in which, on the one hand, the polymer is present in the form of comparatively small particles, having particle sizes of 0.02 to 10 micrometers, for example ("micro"-gel). On the other hand, however, the polymer particles are at least partly intramolecularly crosslinked; the internal structure, therefore, equates to that of a typical polymeric three-dimensional network. Viewed macroscopically, a microgel dispersion of this kind continues to be a dispersion of polymer particles in a dispersion medium, water in particular.

The fraction of the crosslinked polymers can be ascertained following removal of water and any organic solvents, and subsequent extraction of the solid polymer. Crosslinking may be verified via the experimentally accessible gel fraction. It is necessary here to rule out a further increase in the gel fraction from crosslinking reactions subsequent to the isolation of the polymeric solid. The gel fraction is ultimately the fraction of the polymer in the dispersion that cannot be molecularly dispersedly dissolved, as an isolated solid, in a solvent. This insoluble fraction corresponds in turn to the fraction of the polymer that is present in the dispersion in the form of intramolecularly crosslinked particles or particle fractions.

The microgels for use in the context of the present invention are acrylate-based. They comprise or consist of corresponding copolymerized acrylate monomers. Besides the characteristic acrylate monomers, of course, such microgels may also include further monomers, which may likewise be incorporated by radical copolymerization into the polymer. Particularly preferred for use in the context of the present invention, however, are acrylate-based microgels prepared by exclusive use of acrylate monomers, especially (meth)acrylic acid and (meth)acrylates.

Fundamental methods for producing such microgels are known and are described in the prior art: The microgel dispersions (b-1) are prepared preferably via a radical emulsion polymerization, especially a single-stage radical emulsion polymerization, as described in connection with the anionically stabilized binder (b-2b).

The acrylate-based microgel has a glass transition temperature $T_g$ of 50 to 60° C. The glass transition temperature is determined here using DIN 53765 "Thermal Analysis—Dynamic Scanning calorimetry (DSC)", as described in section 2 of the description of the method.

As observed above, the acrylate-based microgel comprises crosslinked polymer particles. Such polymer particles have a gel fraction, by virtue of their crosslinking. Microgels used with preference are highly crosslinked and therefore have a high gel fraction. In one particularly preferred embodiment, therefore, the acrylate-based microgel dispersion has a gel fraction of 80% to 100%, preferably of 85% to 100% more preferably of 88% to 98%, more particularly of 90% to 98%, based in each case on the solids content of the dispersion. The gel fraction here may be determined gravimetrically (see section 14, of the description of the methods). The use of acrylate-based microgel dispersions having the above-recited gel fractions leads to an improved flop effect, an improved surface hardness of the aqueous coating materials and multicoat paint systems produced from them.

The acrylate-based microgel dispersion preferably has a number-average particle size of 100 to 250 nm, more particularly of 120 to 250 nm. The number-average particle size may be determined, for example, by photon correlation spectroscopy (see section 3 of the description of methods).

An acrylate-based microgel dispersion used preferably in the context of the present invention is obtainable by radical emulsion polymerization, especially single-stage radical emulsion polymerization, of
    at least one first monomer (i) which has at least two alkenyl groups, and
    at least one further, monoolefinically unsaturated monomer (ii).

The monomer (i) is preferably selected from the group of ethylene glycol dimethacrylate, tetraethylene glycol dimethacrylate, methylenebisacrylamide, methylbismethacrylamide, divinylbenzene, vinyl methacrylate, vinyl crotonate, divinylacetylene, trivinylbenzene, glycerol trimethacrylate, pentaerythritol tetramethacrylate, triallyl cyanurate, divinylethane, divinyl sulfide, divinyl sulfone, hexatriene, triethylene glycol dimethacrylate, diallylcyanamide, glycol diacrylate, ethylene glycol divinyl ether, diallyl phthalate, trimethylolpropane diallyl ether, divinyldimethylsilane, glycerol trivinyl ether, trimethylol propane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tetraethylene glycol dimethacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octoacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, 1,3-butanediol diacrylate, 1,3-butanediol dimethacrylate, 1,4-butanediol diitaconate, sorbitol triacrylate, sorbitol tetraacrylate, sorbitol tetramethacrylate, sorbitol pentaacrylate, sorbitol hexaacrylate, modified 1,4-butylene diacrylate, 1,6-hexanediol diacrylate, modified trimethylolpropane triacrylate, modified pentaerythritol triacrylate, methylated epoxy resin, and mixtures thereof. Particular preference is given to using 1,6-hexanediol diacrylate as monomer (i). The use of the monomers (i) leads to crosslinking of the resultant polymers. Such polymers therefore have a microgel fraction, with the microgel fraction being dependent on the amount of crosslinking agent and/or monomer (i) used. The amount of the monomer (i) is preferably 50 to 80 wt %, more particularly 60 to 70 wt %, based on the total weight of the monomers (i) and (ii).

The monomer (ii) is monoolefinically unsaturated and therefore has only one alkenyl group. Preference is given to using a mixture of two different monomers (ii), with one monomer having a hydroxyl, carboxylamide or epoxy group and the other monomer being a $C_1$-$C_4$ alkyl ester of (meth)acrylic acid or a vinylaromatic monomer. Monomers which contain hydroxyl, carboxylamide or epoxy groups are selected for example from the group of (meth)acrylic acid, hydroxyethyl (meth)acrylate, and hydroxypropyl (meth)acrylate. $C_1$-$C_4$ alkyl esters of (meth)acrylic acid are, in particular, methyl, ethyl, propyl or butyl (meth)acrylate. Suitable vinylaromatic compounds are styrene or alpha-methylstyrene. Particular preference is given to using as monomer (ii) a mixture of 10 to 90 wt % of hydroxypropyl (meth)acrylate and 10 to 90 wt % of methyl (meth)acrylate, the weight figures being based on the total weight of the monomers (i) and (ii).

The preferably single-stage emulsion polymerization is carried out in water using initiators and emulsifiers that are known to the skilled person. Suitable emulsifiers and initiators are described for example in the laid-open specification U.S. Pat. No. 4,598,111 A.

More preferably the acrylate-based microgel dispersion (b-1) is obtainable by radical, especially single-stage radical, emulsion polymerization of—based on the total weight of the monomers (i) and (ii)—
(i) 60 to 70 wt % of a first monomer containing at least two alkenyl groups, more particularly 1,6-hexanediol diacrylate, and
(ii) a mixture of 10 to 90 wt % of $C_1$-$C_{10}$ hydroxyalkyl (meth)acrylate, especially hydroxypropyl methacrylate, and 10 to 90 wt % of $C_1$-$C_{10}$ alkyl (meth)acrylate, more particularly methyl methacrylate.

The pigment-free component B comprises the acrylate-based microgel dispersion (b-1), preferably in a certain total amount. The pigment-free component B preferably comprises the acrylate-based microgel dispersion (b-1) in a total amount of 4 to 25 wt %, preferably of 6 to 20 wt %, more particularly of 10 to 15 wt %, based in each case on the total weight of the pigment-free component B. The use of the acrylate-based microgel dispersion (b-1) in the above-recited total amounts leads to good mechanical properties and a good effect particle orientation. In particular, the flop and the surface hardness of the aqueous coating material can be increased when using the acrylate-based microgel dispersion (b-1).

According to one particularly preferred embodiment of the present invention, the pigment-free component B comprises not only the above-described aqueous, acrylate-based microgel dispersion but also at least one anionically stabilized binder (b-2).

Anionically Stabilized Binder (b-2):

Suitable anionically stabilized binders (b-2) are selected from the group of anionically stabilized polyurethanes, anionically stabilized (meth)acrylates, anionically stabilized polyurethane-(meth)acrylate hybrid polymers, and mixtures thereof.

To achieve the above-described low VOC content of the pigment-free component B, particular preference is given to using anionically stabilized binders (b-2) in the form of aqueous dispersions of anionically stabilized polymers. More preferably the anionically stabilized binder used in the component B is the same binder as in the aqueous pigment paste A, in other words the above-described aqueous anionically stabilized polyurethane polymer dispersion. It is preferred in accordance with the invention, furthermore, if the component B comprises a further anionically stabilized binder, more particularly an aqueous anionically stabilized acrylate polymer dispersion. In one particularly preferred embodiment, therefore, anionically stabilized binder (b-2) in the pigment-free component B comprises a mixture of the anionically stabilized polyurethane polymer (b-2a) in dispersion in water, described above in connection with the pigment paste A, and of the anionically stabilized acrylate polymer (b-2b) in dispersion in water, described below.

It is therefore particularly advantageous in accordance with the invention if anionically stabilized binder (b-2) in the pigment-free component B comprises at least one anionically stabilized polymer in dispersion in water and having a particle size of 100 to 500 nm, the preparation of the polymer comprising the successive radical emulsion polymerization of three mixtures (A), (B) and (C) of olefinically unsaturated monomers, where the mixture (A) comprises at least 50 wt % of vinylaromatic monomers, and a polymer prepared from the mixture (A) possesses a glass transition temperature of 10 to 65° C., the mixture (B) comprises at least one polyunsaturated monomer, and a polymer prepared from the mixture (B) possesses a glass transition temperature of −35 to 15° C., and the mixture (C) comprises at least one anionic monomer, and a polymer prepared from the mixture (C) possesses a glass transition temperature of −50 to 15° C., and where
i. first the mixture (A) is polymerized,
ii. then the mixture (B) is polymerized in the presence of the polymer prepared under i. and
iii. thereafter the mixture (C) is polymerized in the presence of the polymer prepared under ii.

The dispersion preferably comprises exactly one above-described polymer (b-2b). The preparation of the polymer comprises the successive radical emulsion polymerization of three mixtures (A), (B) and (C) of olefinically unsaturated monomers. Considered in terms of time, the stages may take place directly one after another. It is equally possible, after the end of one stage, for the corresponding reaction solution to be stored for a certain time interval and/or transferred to a different reaction vessel, and for the next stage to take place only then. The preparation of the specific multistage polymer preferably comprises no polymerization steps other than the polymerization of the monomer mixtures (A), (B) and (C).

In the radical emulsion polymerization, olefinically unsaturated monomers are polymerized in an aqueous medium using at least one water-soluble initiator and in the presence of at least one emulsifier. Corresponding water-soluble initiators are known. The at least one water-soluble initiator is preferably selected from the group consisting of potassium, sodium or ammonium peroxodisulfate, hydrogen peroxide, tert-butyl hydroperoxide, 2,2'-azobis(2-amidoisopropane) dihydrochloride, 2,2'-azo-bis-(N,N'-dimethylenisobutyramidine) dihydrochloride, 2,2'-azo-bis-(4-cyanopentanoic acid), and mixtures of the aforesaid initiators, such as hydrogen peroxide and sodium persulfate. Further suitable initiators and transition metal catalysts are disclosed for example in the laid-open specification WO 2017/088988 A1. The initiators are used preferably in an amount of 0.05 to 20 wt %, preferably 0.05 to 10, more preferably of 0.1 to 5 wt %, based on the total weight of the monomers used in the respective polymerization stage.

An emulsion polymerization proceeds in a reaction medium which comprises water as continuous medium and the at least one emulsifier in the form of micelles. The polymerization is initiated by the disintegration of the water-soluble initiator in the water. The growing polymer chain enters into the emulsifier micelles, and the further polymerization then takes place within the micelles. The at least one emulsifier is used preferably in an amount of 0.1-10 wt %, more preferably 0.1-5 wt %, very preferably 0.1-3 wt %, based in each case on the total weight of the monomers used in the respective polymerization stage. Emulsifiers as well are fundamentally known. It is possible for nonionic or ionic emulsifiers, including zwitterionics, and also, optionally, mixtures of the aforesaid emulsifiers, to be used, as described for example in the laid-open specification WO 2017/088988 A1.

The emulsion polymerizations are usefully carried out at a temperature of 0 to 160° C., preferably of 15 to 95° C., more preferably 60 to 95° C. Preference here is given to operating in the absence of oxygen, preferably under an inert gas atmosphere. Generally speaking, the polymerization is carried out under atmospheric pressure, although the application of lower pressures or higher pressures is also possible. Especially if polymerization temperatures are employed which lie above the boiling point of water, of the monomers used and/or of the organic solvents under atmospheric pressure, it is usual to select higher pressures.

The individual polymerization stages when preparing the specific polymer may be carried out in the form, for example, of what are called "starved feed" (alternatively starve fed or starved feed) polymerizations. A starved feed polymerization in the sense of the present invention is an emulsion polymerization in which the amount of free olefinically unsaturated monomers in the reaction solution (also called reaction mixture) is minimized throughout the reaction time. This means that the metered addition of the olefinically unsaturated monomers is such that over the entire reaction time, the fraction of free monomers in the reaction solution does not exceed 6.0 wt %, preferably 5.0 wt %, more preferably 4.0 wt %, particularly advantageously 3.5 wt %, based in each case on the total amount of the monomers used in the respective polymerization stage.

The concentration of the monomers in the reaction solution here may be determined, for example, by gas chromatography, as described in the laid-open specification WO 2017/088988 A1. The fraction of the free monomers may be controlled through the interplay of the amount of initiator, the rate of addition of initiator, the rate of addition of the monomers, and the selection of the monomers. Both the slowing of the metered addition and the increase in the amount of initiator, and also the early commencement of the addition of the initiator, serve the aim of keeping the concentration of the free monomers below the abovementioned limits.

In the context of the present invention it is preferable for polymerization stages ii. and iii. to be carried out under starved feed conditions. This has the advantage that the formation of new particle nuclei in the course of these two polymerization stages is effectively minimized. Instead, the particles existing after stage i. (hence also called seed below) are made to grow further in stage ii. through the polymerization of the monomer mixture B (therefore also called core below). Similarly, the particles existing after stage ii. (hereinafter also called polymer comprising seed and core) can be made to grow further in stage iii. through the polymerization of the monomer mixture C (and therefore also called shell below), resulting ultimately in a polymer comprising particles comprising seed, core, and shell. Of course, stage i. as well may also be carried out under starved feed conditions.

The mixtures (A), (B) and (C) are mixtures of olefinically unsaturated monomers, and the mixtures (A), (B) and (C) are different from one another. Hence they each contain different monomers and/or different fractions of at least one particular monomer.

The mixture (A) contains at least 50 wt %, preferably at least 55 wt %, of vinylaromatic compounds. A corresponding preferred monomer is styrene. Other than the vinylaromatic compounds, the mixture (A) contains no monomers having functional groups containing heteroatoms. With particular preference, the monomer mixture (A) comprises at least one monounsaturated ester of (meth)acrylic acid with an alkyl radical, and at least one monoolefinically unsaturated monomer containing vinyl groups and with a radical on the vinyl group that is aromatic or that is mixedly saturated-aliphatic-aromatic, in which case the aliphatic moieties of the radical are alkyl groups.

The monomers present in the mixture (A) are selected such that a polymer prepared from them possesses a glass transition temperature of 10 to 65° C., preferably of 30 to 50° C. For a purposive estimation of the glass transition temperature to be expected on measurement, it is possible to employ the known Fox equation. Since the Fox equation represents a good approximation, based on the glass transition temperatures of the homopolymers and their parts by weight, without incorporation of the molecular weight, it can be employed as a useful aid to the skilled person at the synthesis stage, allowing a desired glass transition temperature to be set via a few goal-directed experiments.

The polymer prepared in stage i. by the emulsion polymerization of the monomer mixture (A) preferably possesses a particle size of 20 to 125 nm (for the measurement of the particle size, see section 3 of the description of methods).

The mixture (B) comprises at least one polyolefinically unsaturated monomer, preferably at least one diolefinically unsaturated monomer. A corresponding preferred monomer is 1,6-hexanediol diacrylate. Preferably the monomer mixture (B) as well contains no monomers having functional groups containing heteroatoms. With particular preference, other than at least one polyolefinically unsaturated monomer, the monomer mixture (B) contains at any rate the following monomers. Firstly, at least one monounsaturated ester of (meth)acrylic acid having an alkyl radical, and secondly at least one monoolefinically unsaturated monomer containing vinyl groups and having, on the vinyl group, a radical which is aromatic or which is mixedly saturated-aliphatic-aromatic, in which the aliphatic moieties of the radical are alkyl groups.

The fraction of polyunsaturated monomers is preferably from 0.05 to 3 mol %, based on the total molar amount of monomers in the monomer mixture (B).

The monomers present in the mixture (B) are selected such that a polymer prepared from them possesses a glass transition temperature of –35 to 15° C., preferably of –25 to +7° C.

The polymer which is obtained after stage ii. preferably possesses a particle size of 80 to 280 nm, preferably 120 to 250 nm.

The monomers present in the mixture (C) are selected such that a polymer prepared from them possesses a glass transition temperature of –50 to 15° C., preferably of –20 to +12° C.

The olefinically unsaturated monomers of the mixture (C) are preferably selected such that the resultant polymer, comprising a seed, core, and shell, has an acid number of 10 to 25. Accordingly the mixture (C) preferably comprises at least one alpha,beta-unsaturated carboxylic acid, especially preferably (meth)acrylic acid.

The olefinically unsaturated monomers of the mixture (C) are preferably selected, moreover, such that the resultant polymer, comprising seed, core, and shell, has an OH number of 0 to 30, preferably 10 to 25. All of the above-stated acid numbers and OH numbers are values calculated on the basis of the monomer mixtures employed overall.

More preferably the monomer mixture (C) comprises at least one alpha,beta-unsaturated carboxylic acid, at least one monounsaturated ester of (meth)acrylic acid with an alkyl radical substituted by a hydroxyl group, and at least one monounsaturated ester of (meth)acrylic acid with an alkyl radical.

With particular preference neither the monomer mixture (A) nor the monomer mixtures (B) or (C) contain a polyurethane polymer having at least one polymerizable double bond.

The polymer after its preparation possesses a particle size of 100 to 500 nm, preferably 125 to 400 nm, very preferably of 130 to 300 nm, and a glass transition temperature $T_g$ of –20 to –5° C.

The fractions of the monomer mixtures are preferably harmonized with one another as follows. The fraction of the mixture (A) is from 0.1 to 10 wt %, the fraction of the mixture (B) is from 60 to 80 wt %, and the fraction of the mixture (C) is from 10 to 30 wt %, based in each case on the sum of the individual amounts of the mixtures (A), (B) and (C).

The aqueous dispersion preferably possesses a pH of 5.0 to 9.0, more preferably 7.0 to 8.5, very preferably 7.5 to 8.5. The pH may already be kept constant during the preparation, through the use, for example, of bases as stated later on below, or else may be set in a targeted way after the polymer has been prepared. The stages i. to iii. described are preferably carried out without addition of acids or bases known for adjusting the pH, and the pH is adjusted only after the preparation of the polymer, by addition of organic, nitrogen-containing bases, sodium hydrogen carbonate, borates, and also mixtures of the aforesaid substances.

The solids content of the aqueous dispersion is preferably from 15% to 40% and more preferably from 20% to 30%.

The aqueous dispersion comprises preferably a fraction of 55 to 75 wt %, especially preferably 60 to 70 wt %, of water, based in each case on the total weight of the dispersion.

An anionically stabilized polymer (b-2b) used with particular preference in the context of the present invention is preparable by reaction of
    a mixture (A) of 50 to 85 wt % of a vinylaromatic monomer and 15 to 50 wt % of a monounsaturated ester of (meth)acrylic acid with an alkyl radical,
    a mixture (B) of 1 to 4 wt % of a polyolefinically unsaturated monomer, 60 to 80 wt % of a monounsaturated ester of (meth)acrylic acid with an alkyl radical, and 16 to 39 wt % of a vinylaromatic monomer, and
    a mixture (C) of 8 to 15 wt % of an alpha,beta-unsaturated carboxylic acid, 10 to 20 wt % of a monounsaturated ester of (meth)acrylic acid with an alkyl radical substituted by a hydroxyl group, and 65 to 82 wt % of monounsaturated esters of (meth)acrylic acid with an alkyl radical,
where
    i. first the mixture (A) is polymerized,
    ii. then the mixture (B) is polymerized in the presence of the polymer prepared under i. and iii. thereafter the mixture (C) is polymerized in the presence of the polymer prepared under ii.

The above wt % figures are based in each case on the total weight of the mixture (A) or (B) or (C), respectively.

In preferred embodiments of the pigment-free component B, the anionically stabilized polyurethane polymer (b-2a) and the anionically stabilized polymer (b-2b) are present in certain quantity ranges. It is therefore advantageous in accordance with the invention if the pigment-free component B comprises the anionically stabilized polyurethane polymer (b-2a), in dispersion in water, in a total amount of 4 to 15 wt %, more particularly of 6 to 10 wt %, based in each case on the total weight of the pigment-free component B. It is advantageous in accordance with the invention, moreover, if the pigment-free component B comprises the anionically stabilized polymer (b-2b), in dispersion in water, in a total amount of 7 to 12 wt %, more particularly from 8 to 11 wt %, based in each case on the total weight of the pigment-free component B.

In the context of the present invention it is advantageous if the pigment-free component B has a certain weight ratio of the two anionically stabilized binders (b-2). It is therefore preferred in accordance with the invention if the at least one component B has a weight ratio of the total amount of anionically stabilized polyurethane polymer (b-2a) to the total amount of anionically stabilized polymer (b-2b) of 2:1 to 1:2, more particularly of 1:1 to 1:1.5. The anionically stabilized polyurethane polymer is that polymer, in dispersion in water, which was described in connection with component (a). The anionically stabilized polymer (b-2b) has been described above.

The anionically stabilized binder (b-2), especially a mixture of the anionically stabilized polyurethane polymer (b-2a) in dispersion in water, described in connection with the pigment paste A and the above-described anionically stabilized polymer (b-2b) in dispersion in water, is present preferably in certain total amounts in the pigment-free component B. The pigment-free component B preferably comprises the at least one anionically stabilized binder (b-2), preferably a mixture of the above-described anionically stabilized polyurethane polymer (b-2a) and the anionically stabilized polymer (b-2b) in a total amount of 5 to 30 wt %, preferably of 10 to 25 wt %, more particularly of 15 to 20 wt %, based in each case on the total weight of the pigment-free component B. The use of the anionically stabilized binder (b-2) in the above-recited total amounts leads to good mechanical properties and a good effect particle orientation. The mechanical properties and the effect particle orientation can be further enhanced if a combination is used of two different anionically stabilized binders (b-2), more particularly an anionically stabilized polyurethane polymer (b-2a), in dispersion in water, and an anionically stabilized polymer (b-2b) in dispersion in water, in the above-recited total amounts in the pigment-free component B.

The pigment-free component B comprises the aqueous, acrylate-based microgel dispersion (b-1) and also the above-described anionically stabilized binder (b-2) preferably in a certain total amount. The pigment-free component B preferably comprises the aqueous, acrylate-based microgel dispersion (b-1) and also the at least one anionically stabilized binder (b-2), more particularly a mixture of the above-described anionically stabilized binders (b-2a) and (b-2b), in a total amount of 10 to 45 wt %, preferably of 15 to 35 wt %, more particularly of 17 to 25 wt %, based in each case on the total weight of the pigment-free component B. The above-recited total amounts lead to a high mechanical stability, especially to a good adhesion on the original finish, and also to a high condensation resistance and stonechip adhesion, of the aqueous coating materials produced. A good effect particle orientation further occurs in the aqueous coating materials, and hence a good metallic effect. Furthermore, good hiding is achieved.

In the context of the present invention it is advantageous if the pigment-free component B has a certain weight ratio of the aqueous, acrylate-based microgel dispersion (b-1) to the at least one anionically stabilized binder (b-2), especially the mixture of the anionically stabilized binders (b-2a) and (b-2b). It is therefore preferred in accordance with the invention if the at least one pigment-free component B has a weight ratio of the total amount of aqueous, acrylate-based microgel dispersion (b-1) to the total amount of the aqueous dispersions of the anionically stabilized binders (b-2) of 1:4 to 1:8, based in each case on the solids content of the dispersions. Anionically stabilized binders (b-2) present are more preferably the above-stated aqueous dispersions of the anionically stabilized polyurethane polymer (b-2a) and of the anionically stabilized acrylate polymer (b-2b). The use of the binders in the above-recited weight ratios leads to outstanding stabilization of the effect pigments and ensures a good effect particle orientation in the aqueous coating materials. As a result, a good metallic effect and hence also high shade accuracy are achieved. Furthermore, effective hiding is obtained. Additionally, aqueous coating materials produced from this component feature high mechanical stability, especially a good adhesion to the original finish, and also high condensation resistance and stonechip adhesion.

The pigment-free component B likewise has a VOC content of less than or equal to 250 g/L. In order to achieve this VOC content, the amount of organic solvents in the pigment-free component B ought to be extremely low. In one particularly preferred embodiment of the first subject of the invention, therefore, the at least one pigment-free component B comprises organic solvent in a total amount of 0 to 8 wt %, preferably of 0 to 7.5 wt %, more particularly of 0 to 7 wt %, based in each case on the total weight of component B. The term "organic solvent" refers to volatile compounds which at 20° C. have a vapor pressure of more than 10 pascals and/or which possess an initial boiling point of less than or equal to 250° C. at a standard pressure of 101.3 kPa. Through the use of not more than 8 wt % of organic solvents in the pigment-free component B, it is possible to achieve a VOC content of less than or equal to 250 g/L.

The pigment-free component B is preferably also an aqueous composition. Component B therefore preferably has a water content of 20 to 90 wt %, more particularly 30 to 85 wt %, very preferably 60 to 80 wt %, based in each case on the total weight of component B.

Further Constituents:

The at least one pigment-free component B may additionally comprise further customary additives, of the kind also described in the context of the aqueous pigment paste A.

The pigment-free component B is generally prepared by initially introducing the anionically stabilized binders (b-2a) and (b-2b), and mixing them with all of the further constituents, while stirring. The dispersion is subsequently filtered.

Particularly preferred embodiments AF1 to AF13 of the pigment-free component B are given below (all quantities are based on the total weight of the pigment-free component B; where dispersions are used, all of the quantities are based on the solids content of the dispersions in the total weight of the pigment-free component B). AF1: Pigment-free component B, additionally containing at least one anionically stabilized binder (b-2).

AF2: Pigment-free component B, additionally containing 15 to 20 wt % of anionically stabilized binder (b-2).

AF3: Pigment-free component B, additionally containing a first anionically stabilized binder (b-2a) and a second anionically stabilized binder (b-2b).

AF4: Pigment-free component B, additionally containing 6 to 10 wt % of first anionically stabilized binder (b-2a) and 7 to 12 wt % of second anionically stabilized binder (b-2b).

AF5: Pigment-free component B, containing 10 to 15 wt % of an aqueous, acrylate-based microgel dispersion (b-1), the acrylate-based microgel having a glass transition temperature $T_g$ of 50 to 60° C., and additionally 6 to 10 wt % of first anionically stabilized binder (b-2a) and 7 to 12 wt % of second anionically stabilized binder (b-2b).

AF6: Pigment-free component B, comprising a weight ratio of the total amount of aqueous acrylate-based microgel dispersion (b-1) to the total amount of the aqueous dispersions of the anionically stabilized binders (b-2) of 1:4 to 1:8, based in each case on the solids content of the dispersions.

AF7: Pigment-free component B, comprising a weight ratio of the total amount of anionically stabilized polyurethane polymer (b-2a) to the total amount of anionically stabilized polymer (b-2b) of 2:1 to 1:2, more particularly of 1:1 to 1:1.5.

AF8: Pigment-free component B, where the acrylate-based microgel dispersion (b-1) of embodiments AF1 to AF7 has a gel fraction of 80% to 100%, preferably of 85% to 100%, more preferably of 88% to 98%, more particularly of 90% to 98%, based in each case on the solids content of the dispersion.

AF9: Pigment-free component B, where the acrylate-based microgel dispersion (b-1) of embodiments AF1 to AF8 is obtainable by radical emulsion polymerization, more particularly single-stage radical emulsion polymerization, of
(i) 60 to 70 wt %, based on the total weight of the monomers (i) and (ii), of 1,6-hexanediol diacrylate and
(ii) a mixture of 10 to 90 wt % of hydroxyethyl (meth) acrylate and 10 to 90 wt %, based in each case on the total weight of the monomers (i) and (ii), of methyl (meth) acrylate.

AF10: Pigment-free component B, where the anionically stabilized binder (b-2), more particularly the first anionically stabilized binder (b-2a), of embodiments AF1 to AF7 has a number-average molecular weight $M_n$ of 750 to 2 000 000, preferably 750 to 1 000 000, more preferably 750 to 500 000, and more particularly 950 to 15 000 Daltons, an acid number of 5 to 150, preferably 10 to 100, more preferably 15 to 80, and more particularly 20 to 35 mg KOH/g, and an OH number of 1 to 150, preferably 2 to 100, more preferably 5 to 70, and more particularly 10 to 25 mg KOH/g.

AF11: Pigment-free component B, where the anionically stabilized binder (b-2), more particularly the first anionically stabilized binder (b-2a), of embodiments AF1 to AF7 and also AF10 is an anionically stabilized polyurethane polymer in dispersion in water, the anionically stabilized polyurethane polymer being obtainable by reaction of an NCO prepolymer with a modifier in the form of a polyol, especially trimethylolpropane, in an equivalents ratio of NCO prepolymer to modifier of 1.1:1 to 1:1.1, and the NCO prepolymer being obtainable by reaction of
(i) 55 to 70 wt %, based on the total weight of the compounds (i) to (iv), of at least one polyester polyol having an OH number of 40 to 100 mg KOH/g, based on the solids content, and a number-average molecular weight $M_n$ of 1000 to 3000 Da, with the polyester polyol preferably containing no olefinic double bonds,
(ii) 3 to 7 wt %, based on the total weight of the compounds (i) to (iv), of at least one alkanoic acid having 3 to 8 carbon atoms and also two hydroxyl groups on the alpha carbon atom, especially dimethylolpropionic acid,
(iii) 0.5% to 3% by weight based on the total weight of the compounds (i) to (iv), of at least one polyol of the formula (1);

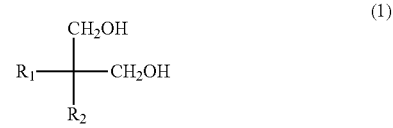

where $R_1=R_2=$methyl and
(iv) 25% to 30%, based on the total weight of the compounds (i) to (iv), of at least one diisocyanate of the formula (2)

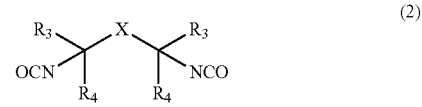

where X=dicyclohexylmethyl radical and $R_3=R_4=$hydrogen.

AF12: Pigment-free component B, where the anionically stabilized binder (b-2), especially the second anionically stabilized binder (b-2b), of embodiments AF1 to AF7 has a glass transition temperature Tg of −20 to −5° C.

AF13: Pigment-free component B, where the anionically stabilized binder (b-2), especially the second anionically stabilized binder (b-2b), of embodiments AF1 to AF7 and also AF12 is an anionically stabilized polymer in dispersion in water, the anionically stabilized polymer being preparable by reaction of
a mixture (A) of 50 to 85 wt % of a vinylaromatic monomer and 15 to 50 wt % of a monounsaturated ester of (meth)acrylic acid with an alkyl radical,
a mixture (B) of 1 to 4 wt % of a polyolefinically unsaturated monomer, 60 to 80 wt % of a monounsaturated ester of (meth)acrylic acid with an alkyl radical, and 16 to 39 wt % of a vinylaromatic monomer, and
a mixture (C) of 8 to 15 wt % of an alpha,beta-unsaturated carboxylic acid, 10 to 20 wt % of a monounsaturated ester of (meth)acrylic acid with an alkyl radical substituted by a hydroxyl group, and 65 to 82 wt % of monounsaturated esters (meth)acrylic acid with an alkyl radical,
where
i. first the mixture (A) is polymerized,
ii. then the mixture (B) is polymerized in the presence of the polymer prepared under i. and
iii. thereafter the mixture (C) is polymerized in the presence of the polymer prepared under ii.

The above-recited embodiments AF1 to AF13 of the pigment-free component B, especially in combination with the embodiments AF1 to AF12 recited in connection with the component A, lead to a good metallic effect and a high shade accuracy. The mechanical properties of the aqueous coating materials, especially the adhesion to the original finish, the condensation resistance, and the stonechip adhesion, can be further improved if additionally at least one anionically stabilized binder (b-2), is used, more particularly a mixture of the above-recited anionically stabilized binders (b-2a) and (b-2b).

In accordance with the invention the aqueous pigment paste A and the pigment-free component B each have a VOC content of less than or equal to 250 g/L. More preferably the aqueous pigment paste A and the pigment-free component B each have a VOC content of 100 to 250 g/L. This ensures that the mixer system likewise has a VOC content of less than or equal to 250 g/L. In this way, the amount of organic solvents released during the application of the mixer system is significantly lowered and hence the environmental burden as well is greatly reduced, though without detrimental effect on the shade accuracy, the metallic effect, the hiding, and the mechanical properties.

Component (c):

As well as the above-recited components A and B, the mixer system may also comprise further components. With particular preference the mixer system further comprises a component C which controls the rheology of the aqueous coating material. It is therefore particularly advantageous in accordance with the invention if the mixer system further comprises a component C, with the component C comprising at least one thickener and also 90 to 98 wt % of water, based on the total weight of the component C.

Suitable thickeners are inorganic thickeners from the group of the phyllosilicates, such as lithium aluminum magnesium silicates. Use may likewise be made of an organic thickener, as for example a (meth)acrylic acid-(meth)acrylate copolymer thickener or a polyurethane thickener, such as the known associative polyurethane thickeners, for example. Associative thickeners are water-soluble polymers which have strongly hydrophobic groups at the chain ends or in side chains, and/or whose hydrophilic chains contain hydrophobic blocks or concentrations in their interior. As a result, these polymers possess a surfactant character and are capable of forming micelles in aqueous phase. In similarity with the surfactants, the hydrophilic regions remain in the aqueous phase, while the hydrophobic regions enter into the particles of polymer dispersions, adsorb on the surface of other solid particles such as pigments and/or fillers, and/or form micelles in the aqueous phase. Ultimately a thickening effect is achieved, without any increase in sedimentation behavior. Particularly preferred thickeners in the context of the present invention are phyllosilicates, especially lithium aluminum silicates.

The aforementioned thickeners, especially the lithium aluminum phyllosilicates, are present in component C in a total amount of 0.1 to 5.0 wt %, preferably 0.2 to 3.0 wt %, in particular 0.3 to 2.0 wt %, based in each case on the total weight of component C.

Component (d):

Furthermore, the mixer system may comprise not only the above-described components A, B and C but also a further component D. This component D is an aqueous pigment paste which comprises at least one color pigment and also at least one anionically stabilized binder and/or at least one nonionically stabilized binder. Unlike component A, component D comprises no effect pigments, and the fraction of effect pigments in component D is therefore 0 wt %, based on the total weight of component D. More preferably the component D comprises at least one color pigment, at least one anionically stabilized binder, and at least one nonionically stabilized binder. An especially preferred embodiment of component D comprises—based in each case on the total weight of component D—

2 to 60 wt % of at least one color pigment,
5 to 20 wt % of an anionically stabilized binder,
3 to 15 wt % of a nonionically stabilized binder.

Color pigments, anionically and nonionically stabilized binders included are those color pigments, anionically stabilized binders (a-2), and nonionically stabilized binders (a-3) described in connection with component A.

In the context of the present invention it is particularly preferred if the mixer system comprises at least 1 to 100 components D.

Component (e):

Furthermore, the mixer system of the invention may comprise a further, pigment-free component E, which is different from the pigment-free component B. The further pigment-free component E comprises not only the aqueous, acrylate-based microgel dispersion (b-1) and the above-recited anionically stabilized binders (b-2a) and (b-2b) but also an aqueous dispersion of an anionically stabilized polyurethane-poly(meth)acrylate hybrid polymer (e-3), where the hybrid polymer is obtainable by a radical reaction of (i) a nonionic polyurethane polymer having a number-average molecular weight of 1000 to 30 000 Da, more particularly 1500 to 20 000 Da, and on average per molecule 0.05 to 1.1, more particularly 0.2 to 0.9, polymerizable double bonds, with
(ii) at least one ethylenically unsaturated monomer having at least one carboxylic acid in the presence of at least one water-insoluble initiator, where the weight ratio between nonionic polyurethane polymer and the at least one ethylenically unsaturated monomer is from 1:10 to 10:1.

The nonionic polyurethane polymer is preferably obtainable by reaction of (a) a polyester polyol having a number-average molecular weight of 400 to 5000 Da,
(b) at least one polyisocyanate optionally together with at least one monoisocyanate,
(c) at least one compound which as well as a monoolefinically unsaturated group comprises at least one group that is reactive toward NCO groups, and
(d) at least one organic compound containing hydroxyl and/or amino groups and having a molecular weight of 60 to 399 Da.

The nonionic polyurethane polymer is preferably prepared by first preparing an NCO prepolymer from (a) to (d), and then further reacting it in equimolar amounts, relative to the NCO groups, with the component (d). The reaction of the components (a) to (d) may also be carried out in the presence of catalysts, such as dibutyltin dilaurate, dibutyltin maleate, and tertiary amines, for example.

The amounts of (a) to (d) to be used are evident from the target number-average molecular weight $M_n$. The olefinically unsaturated groups are preferably acrylate, methacrylate or allyl ether groups, more particularly allyl ether groups.

Suitable polyester diols (a) and also polyisocyanates (b) are the compounds described in connection with the anionically stabilized polyurethane polymer (a-2).

Particular preference is given to using compounds (c) which as well as a monoolefinically unsaturated group, especially allyl ether group, further comprise two groups that are reactive toward NCO groups. Examples of groups that are reactive toward NCO groups include —OH, —SH, >NH and —NH$_2$ groups, preferably —OH groups. Use may be made, for example, of 2,3-dihydroxypropyl monoallyl ether, allyl 2,3-dihydroxypropanoate, glycerol monoallyl ether, pentaerythritol monoallyl ether, pentaeythritol diallyl ether, trimethylolpropane monoallyl ether, and trimethylolpropane diallyl ether. Particularly preferred for use is trimethylolpropane monoallyl ether. It is preferred for the compound (c) to be incorporated in an in-chain position (not terminally) into the nonionic polyurethane polymer.

Component (d) used preferably comprises diamines and/or polyamines having primary and/or secondary amino groups, and also diols of the formula (1) above. Preference is given to using diamines and also diols of the formula (1) above. Diamines include hydrazine, ethylenediamine, propylenediamine, 1,4-butylenediamine, piperazine, 1,4-cyclohexyldimethylamine, hexamethylene-1,6-diamine, trimethylhexamethylenediamine, menthanediamine, isophoronediamine, diethanolamine, and aminoethylethanolamine. Particular preference is given to using diethanolamine.

The hybrid polymer is obtainable by radically polymerizing an ethylenically unsaturated monomer or a mixture of ethylenically unsaturated monomers in the presence of the nonionic polyurethane, using a water-insoluble initiator or a mixture of water-insoluble initiators, the weight ratio between the nonionic polyurethane polymer and the ethylenically unsaturated monomer or mixture of ethylenically unsaturated monomers being between 1:10 and 10:1, preferably between 1:2 and 2:1.

Ethylenically unsaturated monomers used are preferably as follows:
(i) aliphatic esters of (meth)acrylic acid containing neither hydroxyl nor carboxyl groups, more particularly methyl, ethyl, propyl, butyl, hexyl, ethylhexyl, stearyl, and lauryl acrylate and methacrylate or mixtures of these monomers,
(ii) ethylenically unsaturated monomers carrying at least one carboxyl group in the molecule, more particularly acrylic acid, methacrylic acid, ethacrylic acid, crotonic acid, maleic acid, fumaric acid, and itaconic acid,
(iii) and also mixtures of components (i) and (ii).

Ethylenically unsaturated monomers used are preferably mixtures consisting of 40 to 95, preferably 85 to 95 wt % of component (i) and 5 to 60 wt %, preferably 5 to 15 wt %, of component (ii), the sum of the weight fractions of (i) and (ii) always making 100 wt %.

Water-insoluble initiators used may be, for example, water-insoluble azocompounds and water-insoluble peroxy compounds. Examples of water-insoluble peroxy compounds are tert-amyl peroxy-2-ethylhexanoate, tert-butyl peroxy-2-ethylhexanoate, di-tert-butylperoxide, dilauryl peroxide, dibenzoyl peroxide, and 1,1-dim ethyl-3-hydroxybut-(1)-yl peroxyethylhexanoate.

In the context of the present invention, the mixer system may comprise at least 1 to 3 components E.

Component (f):
Furthermore, the mixer system may comprise at least one crosslinker component F comprising at least one crosslinking agent. Examples of such crosslinking agents are amino resins, polyisocyanates, and also blocked polyisocyanates, as described in the laid-open specification EP 0 614 951 A2. As well as the crosslinking agent, binders may be present. The same binders as in the pigment-free component B are preferably present.

With particular preference the components C, D, E and F likewise each have a VOC content of 0 to 250 g/L, more particularly of 100 to 250 g/L.

A preferred embodiment of the mixer system of the invention is a mixer system in which all pigment pastes A and optionally D comprise the same binder or—in the case of a binder mixture—the same binders. This ensures high miscibility and also high compatibility of the components of the mixer system.

Particularly preferred mixer systems of the present invention comprise the following components:
(a) at least one, especially 1 to 100, above-described aqueous pigment paste(s) A,
(b) at least one above-described pigment-free component B,
(c) at least one above-described component C,
(d) at least one, especially 1 to 100, above-described aqueous pigment paste(s) D,
(e) optionally at least one above-described pigment-free component E, and
(f) optionally at least one above-described crosslinker component F.

To produce the aqueous coating material, depending on the desired shade of the aqueous coating material, one or more components (a) of the mixer system are then mixed with at least one component (b), optionally at least one component (c), and optionally one or more components (d) and (f), directly before the application of the aqueous coating material.

The second subject of the present invention therefore relates to a method for producing aqueous coating materials having a VOC content of 0 to 250 g/L, more particularly of 100 to 250 g/L, by mixing at least two aqueous components, wherein a mixer system of the invention is used and the aqueous coating materials are produced by mixing the pigment paste A of the pigment-free component B and optionally the component C.

The various aqueous pigment pastes A and optionally D are mixed, for producing the aqueous coating materials, in a ratio such as to result in the desired shade. The mixing ratio of the component A and optionally D with the component or various components B is determined by the requirement for the resulting coating material, independently of the shade, to have the desired viscosity, the desired solids content, and the desired amount of organic solvents, etc. Furthermore, the mixing ratio is determined by the required technological properties—the adhesion, for example.

The aqueous coating materials produced from the mixer system of the invention have a VOC content of 0 to 250 g/L, more particularly of 100 to 250 g/L. In one particularly preferred embodiment of the second subject of the invention, therefore, the aqueous coating material comprises organic solvents in a total amount of 0 to 7 wt %, more particularly of 0 to 6 wt %, based in each case on the total weight of the coating materials. The definition of the organic solvents is subject to the statements made above for components A and B.

The aqueous coating materials produced from the mixer system of the invention have excellent shade accuracy, a good metallic effect and good hiding and good mechanical properties, especially good adhesion to the original finish, and also a high condensation resistance and stonechip adhesion.

The aqueous coating materials produced using the mixer system of the invention may be applied to a wide variety of different substrates, such as metal, wood, plastic or paper, for example. The aqueous coating materials produced by means of the mixer system of the invention are especially suitable for the refinishing of damaged sites, especially for automotive refinish. The coating materials in this case are applied, directly after their production by mixing of components (a) and (b) and also, optionally, of further components (c), (d) and (f), to the appropriately prepared damaged site (e.g., by spackling and filling), by means of customary methods, especially spraying. It is particularly preferred in this context if no flashing takes place between the multiple application of the aqueous coating materials. The aqueous coating materials produced using the mixer system of the invention are preferably used in order to produce a basecoat.

After initial drying of the basecoat thus produced, at room temperature, or by forced drying (e.g., 10 min. at 60° C., 80° C. or IR drying), a suitable transparent topcoating composition is applied. Suitability as topcoat material is possessed both by organically dissolved and by aqueous 1- or 2-component clearcoat materials, and also powder clearcoat materials. Frequently employed are 2-component clearcoat materials based on a hydroxyl-group-containing acrylate copolymer and a polyisocyanate. Such clearcoat materials are described in patent applications DE 34 12 534, DE 36 09 519, DE 37 31 652, and DE 38 23 005, for example. Suitable 1-component clearcoat materials, based for example on a hydroxyl-group-containing binder and an amino resin curing agent, are likewise known and are described, for example, in Kittel, Lehrbuch der Lacke and Beschichtungen, volume IV; W. A. Colomb in der H. Heeremann GmbH, Berlin-Oberschwandorf 1976. Of course, however, all other clearcoat materials, not explicitly stated here, are suitable.

After any required flash-off time of around 5 minutes, the basecoat is then dried together with the topcoat. When using 2-component clearcoat materials, the drying takes place generally at temperatures of below 100° C., preferably at below 80° C. The dry film thicknesses of the basecoat are in general between 5 and 25 μm, those of the topcoat in general between 30 and 70 μm.

When using 1-component clearcoat materials, the basecoat is dried together with the topcoat at elevated temperatures, of around 120° C., for example. The dry film thicknesses of the topcoat in this case are in general between 30 and 50 μm.

Regarding further embodiments of the method of the invention, especially regarding the components used for producing the aqueous coating materials, the statements made in relation to the mixer system of the invention are valid mutatis mutandis.

Finally, a third subject of the present invention is the use of a mixer system of the invention for producing aqueous coating materials for refinishing and/or for the coating of automobile bodies and/or plastics parts.

Regarding further embodiments of the use in accordance with the invention, especially regarding the mixer system used, the statements made in relation to the mixer system of the invention and also the method of the invention are valid mutatis mutandis.

Examples

Description of Methods:
1. Solids Content (Solids, Nonvolatile Fraction)

The nonvolatile fraction is determined in accordance with DIN EN ISO 3251 (date: June 2008). This determination is accomplished by weighing out 1 g of sample into an aluminum dish dried beforehand and carrying out drying in a drying oven at 110° C. for 60 minutes, followed by cooling in a desiccator, and then by reweighing. The residue, relative to the total amount of the sample employed, corresponds to the nonvolatile fraction. The volume of the nonvolatile fraction may be determined, if necessary, in accordance optionally with DIN 53219 (date: August 2009).

2. Glass Transition Temperature ($T_g$):

The glass transition temperature $T_g$ in the context of the invention is determined experimentally in a method based on DIN 51005 "Thermal analysis (TA)—terms" and DIN 53765 "Thermal analysis—dynamic scanning calorimetry (DSC)". Here, a sample of 15 mg is weighed out into a sample boat and inserted into a DSC instrument. Cooling takes place to the start temperature, and subsequently 1st and 2nd measuring runs are carried out with inert gas purging ($N_2$) of 50 mL/min with a heating rate of 10 K/min, with cooling back down to the start temperature between the measuring runs. The measurement takes place customarily in the temperature range from about 50° C. lower than the expected glass transition temperature to about 50° C. higher than the glass transition temperature. The glass transition temperature in the context of the present invention and in accordance with DIN 53765, section 8.1, is that temperature in the 2nd measuring run at which half the change in the specific heat capacity is reached (0.5 delta $c_p$). It is ascertained from the DSC diagram (plot of the heatflow against the temperature). It is the temperature which corresponds to the point of intersection at the center line between the extrapolated baselines before and after the glass transition with the measurement plot.

3. Particle Size

The particle size of the polymers is determined by dynamic light scattering in accordance with DIN ISO 13321 (October 2004). In the context of the present invention, particle size refers to the measured average particle diameter (Z-average mean).

4. Determining the Amount of Free NCO Groups

The amount of free isocyanate groups, also referred to below as NCO content, is determined by adding an excess of a 2% strength N,N-dibutylamine solution in xylene to a homogeneous solution of the samples in acetone/N-ethylpyrrolidone (1:1 vol %), by potentiometric back-titration of the amine excess with 0.1 N hydrochloric acid, in accordance with DIN EN ISO 3251, DIN EN ISO 11909, and DIN EN ISO 14896. The NCO content of the polymer, based on solids, can be calculated back via the fraction of a polymer (solids content) in solution.

5. Determination of Acid Number

The acid number is determined in accordance with DIN EN ISO 2114 (date: June 2002), using "method A". The acid number corresponds to the mass of potassium hydroxide in mg which is needed to neutralize 1 g of sample under the conditions specified in DIN EN ISO 2114. The stated acid number corresponds to the total acid number stated in the DIN standard, based on the solids content.

6. Determining the OH Number

The OH number is determined in accordance with DIN 53240-2 (date: November 2007). In this method, the OH groups are reacted by acetylation with an excess of acetic anhydride. The excess acetic anhydride is subsequently cleaved by addition of water to form acetic acid, and the entire acetic acid is back-titrated with ethanolic KOH. The OH number indicates the amount of KOH in mg which is equivalent to the amount of acetic acid bound in the acetylation of 1 g of sample, and is based here on the solids content.

7. Determining the Number-Average and Weight-Average Molecular Weights

The number-average molecular weight ($M_n$) is determined by means of gel permeation chromatography (GPC) in accordance with DIN 55672-1 (date: August 2007). Besides the number-average molecular weight, this method may also be used to determine the weight-average molecular weight ($M_w$) and also the polydispersity d (ratio of weight-average molecular weight ($M_w$) to number-average molecular weight ($M_n$)). Tetrahydrofuran is used as eluent. The determination is made against polymethyl methacrylate standards. The column material consists of styrene-divinylbenzene copolymers.

8. Production of Multicoat Systems 8.1 Mixer System of the Invention

To assess the properties of aqueous coating materials obtained using the mixer system of the invention, multicoat paint systems are produced according to the following general protocol:

A steel panel coated with a standard black electrocoat (CathoGuard® 580 Schwarz from BASF Coatings), and then padded (manual ruffling of the substrate using a 3M™ Scotch-Brite™ abrasive cloth), and subsequently cleaned with a cleaning composition (Glasurit® 700-1). First of all, using a spray gun (SATAjet® HVLP 4000, entry pressure: 2 bar, pressure at the nozzle: 0.7 bar) a commercial primer-surfacer (Glasurit® 285-270 Grundfüller Pro, Glasurit® 929-58 Füllerhärter Pro and Glasurit® 352-91 Einstellzusatz in a volume ratio of 5:1:1) is applied in two spray passes and then dried at 60° C. for 30 minutes; the resulting dry film thickness is to be 60 µm.

After initial sanding by means of an eccentric sander (adhesive sanding sheets 150 mm P 500) and subsequent cleaning with a cleaning composition (Glasurit® 700-1), the respective aqueous coating material is applied with a spray gun (SATAjet® HVLP 4000, entry pressure: 2 bar, pressure at the nozzle: 0.7 bar) in two spray passes without flashing in between (i.e., wet-on-wet application) and subsequently flashed off until the surface appears uniformly matt. The resulting total dry film thickness of the respective coating composition is to be 10 to 20 µm. Subsequently, in two spray passes, the application takes place of a commercial clearcoat material (Glasurit® 923-335 HS-Multi-Klarlack and Glasurit® 929-33 Harter in a volume ratio of 2:1, and also, on this mixture, a 10% volume fraction of Glasurit® 352-91 I) with a target dry film thickness of 50-60 µm. Drying is carried out at 60° C. for 30 minutes.

8.2 Noninventive Mixer System (Glasurit® 90 Line)

To assess the properties of aqueous coating materials obtained using a noninventive mixer system (Glasurit® 90 line), multicoat paint systems are produced in accordance with the following general protocol:

A steel panel coated with a standard black electrocoat (CathoGuard® 580 Schwarz from BASF Coatings) is padded, cleaned, and then coated with a commercial primer-surfacer, as described in section 8.1.

After initial sanding by means of an eccentric sander (adhesive sanding sheets 150 mm P 500) and subsequent cleaning with a cleaning composition (Glasurit® 700-1), the respective aqueous coating material is applied with a spray gun (SATAjet® HVLP 4000, entry pressure: 2 bar, pressure at the nozzle: 0.7 bar) in two to three spray passes, with flashing off for 5 minutes after each spray pass, until the surface appears uniformly matt. The resulting total dry film thickness of the respective coating composition is to be 10 to 15 µm. Subsequently, in two spray passes, a commercial clearcoat material is applied, as described in section 8.1. The drying is carried out at 60° C. for 30 minutes.

9. Determination of the Moisture Resistance

To determine the resistance of aqueous coating materials and also comparative compositions to moisture, appropriately coated substrates are subjected in accordance with DIN EN ISO 6270-2 (date: September 2005) to a constant humidity test under CH test conditions over a period of 10 days in a conditioning chamber. One hour and 24 hours after removal from the conditioning chamber, the panels were then inspected for blistering.

The incidence of blisters is assessed as follows:

The number of blisters is evaluated by a quantitative figure from 0 to 5, with 1 denoting very few and 5 very many blisters.

To assess the technological properties of the multicoat systems after condensation exposure, cross-cuts are carried out in accordance with DIN EN ISO 2409 (rating 0 to 5; 0=best value; 5=worst value).

10. Determination of the Adhesion Properties in the Stonechip Test

The assessment of the multicoat paint systems for stonechip adhesion is made according to DIN EN ISO 20567-1 (April 2007), Method B. The resultant damage is likewise assessed in accordance with DIN EN ISO 20567-1.

11. Determination of the Dry Film Thicknesses

The film thicknesses are determined in accordance with DIN EN ISO 2808 (date: May 2007), Method 12A, using the MiniTest® 3100-4100 instrument from ElektroPhysik.

12. Determination of the Angle-Dependent Lightnesses/Flop Index

To determine the lightness or the flop index, an appropriately coated substrate (multicoat system as per section 8) is subjected to measurement using a spectrophotometer (e.g., X-Rite MA60B+BA Multi-Angle Spectrophotometer). This involves the surface being illuminated with a light source. Spectral detection in the visible range is carried out at various angles. The resulting spectral measurement data can be used, with incorporation of the standard spectral values and of the reflection spectrum of the light source used, to calculate color values in the CIEL*a*b* color space, where L* characterizes the lightness, a* the red-green value and b* the yellow-blue value.

This method is described for example in ASTM E2194-12, especially for coatings whose pigment includes at least one effect pigment. The derived value which is often employed to quantify the so-called metallic effect is the so-called flop index, which describes the relationship between the lightness and the angle of observation. A flop index (FI) can be calculated from the lightness values ascertained for the viewing angles of 25° and 75° in accordance with the formula $$FI = L^*_{25°}/L^*_{75°} \cdot 100$$

where L* stands for the lightness value measured at the respective measurement angle (25° and 75°).

13. Determination of the VOC Content

The VOC content of the aqueous refinish compositions is determined according to DIN ISO 11890-1 or DIN ISO 11890-2 (September 2009).

14. Determination of the Gel Fraction of the Aqueous Microgel

The gel fraction can be determined gravimetrically by freeze-drying the dispersion, determining the total mass of the freeze-dried polymer, and then extracting the polymer for 24 hours at 25° C. in an excess of tetrahydrofuran (ratio of tetrahydrofuran to freeze-dried polymer=300:1). The insoluble fraction is removed and dried in an air circulation oven at 50° C. for four hours. Thereafter, the dried, insoluble fraction is weighed and the quotient is formed with the total mass of the freeze-dried polymer. The value obtained corresponds to the gel fraction.

15. Testing of the Resistance of Coatings to Pressurized Water Jet

The testing of the multicoat systems produced in accordance with section 8, using a pressurized water jet, takes place according to DIN EN ISO 16925 (2014-06).

16. Freeze-Thaw Stability

First of all, the pH (measured at 23° C.) and also the viscosity of the corresponding aqueous pigment paste are determined under a shearing load of $10 \text{ s}^{-1}$, $100 \text{ s}^{-1}$ and $1000 \text{ s}^{-1}$ (measured using a rotational viscometer (Rheolab QC apparatus with C-LTD80/QC conditioning system from Anton Paar) at 23° C.). Then 200 g of the corresponding aqueous pigment paste are stored at −18° C. for 8 h in a tightly sealed glass bottle, and then kept at room temperature for 16 h. This procedure is repeated three times more. After that, the pH and the viscosity are determined again, and the pigment paste is assessed in terms of sedimentation behavior.

Illustrative Embodiments

The inventive and comparative examples below serve to illustrate the invention, but should not be interpreted as imposing any restriction.

Unless indicated otherwise, the amounts in parts are parts by weight, and the amounts in percent are percentages by weight, in each case.

1. Preparation of the Binders for Components A, B and Optionally D and E 1.1 Preparation of the Anionically Stabilized Polyurethane Polymer D1 in Dispersion in Water [(a-2) and (b-2a)]

1.1.1 Preparation of the Polyester Resin PE1

55 wt % of a commercial dimer fatty acid (iodine number of 10 mg $I_2$/g, monomer content of max. 0.1%, trimer content of not more than 2%, acid number of 195 to 200 mg KOH/g, saponification number of 197 to 202 mg KOH/g), 30 wt % of 1,6-hexanediol and 15 wt % of isophthalic acid are condensed with addition of cyclohexane as azeotrope former to an acid number (determined relative to nonvolatile fraction) of 3 to 4 mg KOH/g. Any cyclohexane present is removed under reduced pressure and the polyester is diluted with methyl ethyl ketone to a solids content of 73%. The resulting polyester resin PE1 has an OH number (solids) of 71 to 75 mg KOH/g and also a calculated molecular weight of 1400 D.

1.1.2 Preparation of the Anionically Stabilized Polyurethane Polymer P1 in Dispersion in Water [(a-2) and (b-2a)]

Under nitrogen as inert gas atmosphere, 4.36 parts of dimethylolpropionic acid, 23.5 parts of dicyclohexylmethane 4,4'-diisocyanate, 0.9 part of neopentyl glycol and 48.75 parts of the polyester PE1 are combined. Following addition of methyl ethyl ketone, the mixture is reacted with stirring (at a solids content of 67±1%) at 80-82° C. The reaction is monitored by determination of the isocyanate content of the solution. When a constant value is reached for the isocyanate content, of 1.0% to 1.2% (based on solution), trimethylolpropane (TMP) is added for chain extension, in an NCO: TMP ratio of 1:1.1, the prepolymer is reacted to give an OH-functional polyurethane polymer having an arithmetic OH number of 17 mg KOH/g (based on resin solids). The polymer is then neutralized to an extent of 70% with N,N'-dimethylethanolamine, and dispersed by addition of water and of a polypropylene glycol having an average molar mass of 900 D. The methyl ethyl ketone is then removed by distillation The anionic polyurethane polymer dispersion thus obtained has a solids content of 29%-31% and a pH of 7.7 and contains 20% of polypropylene glycol, based on the polyurethane polymer content.

1.2 Preparation of the Nonionically Stabilized Acrylate Polymer D2 in Dispersion in Water [(a-3)]

A stirred tank equipped with two separate feed lines, anchor stirrer and thermometer is charged with a mixture of butyl glycol and water (1:1). The stirred tank is subsequently subjected to nitrogen with an absolute pressure of 2.5 bar. With continuing stirring, a mixture of 3.7 parts of butyl glycol and 6.4 parts of tert-butyl peroxy-2-ethylhexanoate is metered in via a feed line over 4 hours and 45 minutes. Via the second feed, a mixture of 26 parts of methacrylic ester of methoxypolyethylene glycol having an average molar mass of 2000 D in the form of a 50% strength aqueous solution (e.g., BisomerS20W® from GEO Specialty Chemicals), 8.55 parts of styrene, 4.7 parts of n-butyl acrylate, 8.34 parts of N-(2-methacryloyloxyethyl)ethyleneurea in the form of 50% strength aqueous solution, 3.36 parts of methyl methacrylate, 0.84 part of N,N'-dimethylaminopropylmethacrylamide, 6.5 parts of hydroxyethyl methacrylate and 18.5 parts of butyl glycol is metered over 4 hours and 30 minutes, with the second feed starting 15 minutes after the beginning of the first feed.

After a postpolymerization phase of 60 minutes, butyl glycol is used to set a water:Butyl glycol ratio=45:55 at a solids content of 45%±1%. The acid number of the resin is 4.0 to 6.0 mg KOH/g, based on the solids content.

1.3 Preparation of the Aqueous, Acrylate-Based Microgel Dispersion D3 [(b-1)]

A reaction vessel equipped with stirrer, thermometer, two feeds and a reflux condenser is charged under nitrogen with 50.73 parts of water and 0.6 part of Aerosol MA 80 surfactant. The monomer feed vessel is filled with 0.25 part of Aerosol MA 80 surfactant, 0.6 part of Aerosol EF 800 surfactant, 603 parts of hexanediol diacrylate, 12.605 parts of methyl methacrylate, 2.105 parts of hydroxypropylmethacrylate, and 0.151 part of deionized water.

The initiator feed vessel is filled with 7.5 parts of deionized water containing, in solution, 0.255 part of ammonium peroxydisulfate.

At a reactor temperature of 83° C., 10-% of the initiator feed is metered in over 10 minutes, and then the reactor is maintained at 83° C. for a further 15 minutes. Then the feed of the monomer mixture and of the initiator mixture is commenced simultaneously; the monomer mixture is metered in over 180 minutes and the initiator solution over 210 minutes. Thereafter the monomer feed vessel is rinsed with 0.5 part of deionized water and the initiator feed vessel with 0.37 part of deionized water. The rinsing quantities are passed into the reaction mixture. The 83° C. are maintained for 60 minutes more, and then the polymer dispersion is discharged and the reactor is rinsed with 0.628 part of deionized water, with the rinsing quantity likewise being passed to the polymer dispersion. The dispersion is subsequently filtered with a filter bag of 5 μm. The result is a white dispersion having a solids content of 22±1%, measured at 110° C. for 60 minutes. The number-average particle size is 130 to 230 nm.

1.4 Preparation of the at Least One Anionically Stabilized Polymer D4 in Dispersion in Water [(b-2b)]

The polymer in dispersion in water is prepared as described in laid-open specification WO 2017/088988 A1 for the example BM2.

The dispersion D4 prepared has a solids content of 25.5%, a particle size of 240 nm and a glass transition temperature $T_g$ of −9° C.

1.5 Preparation of the Anionically Stabilized Polyurethane-(Meth)Acrylate Hybrid Polymer (D5) in Dispersion in Water [(b-3)]

1.5.1 Polyurethane Precursor

A stirred tank equipped with an anchor stirrer, thermometer and a reflux condenser is used to keep 53 parts of the polyester resin PE1, 0,05 part of dibutyltin dilaurate, 2.1 parts of neopentyl glycol, 0.7 part of trimethylolpropane monoallyl ether, 16.5 parts of dicyclohexylmethane 4,4'-diisocyanate (CAS-No.: 5124-30-1), and 22.5 parts of methyl ethyl ketone at 80° C. until the NCO content of the solution has reached 1.0%-1.2%. After the characteristic numbers have been reached, the resulting isocyanate prepolymer is reacted with diethanolamine, the amount of the diethanolamine being calculated equimolarly to the amount of the isocyanate. A solids content of 60% to 62% is subsequently established using methyl ethyl ketone.

1.5.2 Acrylate Stage

A stirred tank equipped with two separate feed lines, anchor stirrer and thermometer is charged with 24 parts of the polyurethane precursor. An inert gas atmosphere is generated in the reactor using nitrogen. 2.7 parts of n-butyl acrylate, 2.6 parts of butyl methacrylate, 8 parts of methyl methacrylate and 1.13 parts of methacrylic acid are metered in over 3 hours. In parallel, a mixture of 3 parts of methyl ethyl ketone and 0.7 part of tert-butyl per-2-ethylhexanoate is metered into the vessel over 3 hours and 45 minutes likewise; the 2nd feed here starts 15 minutes before the 1st feed The temperature of the tank is maintained at 80° C. After a postpolymerization phase of 60 minutes, 0.9 part of N,N'-dimethylethanolamine and subsequently 50 parts of water are metered in over 1 h. Then reduced pressure is applied and the methyl ethyl ketone is removed entirely by distillation. Water is then added to establish a solids content of 35%. This gives a white dispersion having an acid number of 28 to 30 mg KOH/g, based on the solids content, with a pH of 8.5 to 9.0.

2. Preparation of Aqueous Pigment Paste A 2.1 Phyllosilicate Solution SL 3 wt % of a phyllosilicate (Laponite RD) are dispersed with 0.1 wt % of a biocide (Acticide MBR1) and 3 wt % of polypropylene glycol (Pluriol P 900, available from BASF SE) in deionized water.

2.2 Aluminum Base Paint 1

Metered into 57 parts of D1 and 10 parts of the phyllosilicate solution SL, with stirring, are 5 parts of a commercial dispersion of fumed silica (Aerodisp WR8520), 20 parts of a slurry of passivated aluminum flakes (Emeral F 7640) in butyl glycol, and 10 parts of water. This is then made up with 3 parts of D2. The aluminum paste has a VOC of 184 g/L.

2.3 Aluminum Base Paint 2

Metered into 56 parts of D1 and 10 parts of the phyllosilicate solution SL, with stirring, are 5 parts of a commercial dispersion of fumed silica (Aerodisp WR8520), 22 parts of a slurry of passivated aluminum flakes (Emeral F 4640) in butyl glycol, and 4 parts of water. This is then made up with 3 parts of D2. The aluminum paste has a VOC of 204.1 g/L.

2.4 Blue Effect Base Paint

A mixture of 50.7 parts of D1 and 1.7 parts of water is admixed, with stirring, with 4.7 parts of a commercial dispersion of fumed silica (Aerodisp WR8520), 9.4 parts of the phyllosilicate solution SL, 5 parts of butyl glycol, 11.3 parts of a blue interference pigment (T81-23 SW Liquid Blue), and 7.5 parts of a blue pearlescent pigment (Iriodin 9221), a further 5 parts of water, and 4.7 parts of D2. The blue pigment paste has a VOC of 200 g/L.

2.5 Green Effect Base Paint

A mixture of 50.7 parts of D1 and 1.7 parts of water is admixed, with stirring, with 4.7 parts of a commercial dispersion of fumed silica (Aerodisp WR8520), 9.4 parts of the phyllosilicate solution SL, 5 parts of butyl glycol, 18.8 parts of a green pearlescent pigment (Iriodin 9444), a further 5 parts of water, and 4.7 parts of D2. The green pigment paste has a VOC of 200 g/L.

2.6 White Effect Base Paint

A mixture of 50.7 parts of D1 and 1.7 parts of water is admixed, with stirring, with 4.7 parts of a commercial dispersion of fumed silica (Aerodisp WR8520), 9.4 parts of the phyllosilicate solution SL, 5 parts of butyl glycol, 18.8 parts of a white pearlescent pigment (Iriodin 9119), a further 5 parts of water, and 4.7 parts of D2. The white pigment paste has a VOC of 200 g/L.

3. Preparation of Pigment-Free Component B:

32.5 parts of D4 and 32.5 parts of polyurethane dispersion D1 are admixed, with stirring, with 1.5 parts of a 52% strength solution of TMDD in butyl glycol, 2.2 parts of butyl glycol, 2.2 parts of 1-n-pentanol, and 12 parts of the phyllosilicate solution SL, and also with 2 parts of a 10% strength dimethanolamine solution, 2 parts of a commercial thixotropic agent (Rheovis AS 130), 0.3 part of a commercial polymer thickener (Acrysol RM8), and 12.8 parts of D3, and then filtered. The resulting pigment-free component B has a VOC of 230 g/L.

4. Preparation of Component C:

1.5 wt % of a phyllosilicate (Laponite RD) are dispersed with 0.18 wt % of a biocide (Acticide MBR1) and 1 wt % of polypropylene glycol (Pluriol P 900, available from BASF SE) in deionized water.

5. Preparation of Aqueous Pigment Pastes D:

5.1 White Base Paint

A mixture of 44 parts of D1 and 2.3 parts of butyl glycol, 3 parts of wetting agent such as BYK 199, for example, is admixed, with intensive stirring, with 1 part of a hydrophobized fumed silica (Aerosil R972), 25 parts of a transparent titanium dioxide (Tayca MT-700 HD), 0.2 part of a 10% strength N,N'-dimethylethanolamine solution, and 9 parts of D2, and 2.5 parts of water are added. This mixture is dispersed on a bead mill. This dispersion is subsequently made up with an additional 6.4 parts of water, 1.8 parts of 1-pentanol, and 4 parts of D1. The resulting white paste has a VOC of 2.4 g/L.

5.2 Black Base Paint

Incorporated with stirring at a high shearing rate into a mixture of 15.5 parts of D2, 9.9 parts of water, 1 part of a commercial solvent-free wetting agent (BYK 345) and 2.5 parts of butyl glycol, 1 part of a 10% N,N'-dimethylethanolamine solution, 0.3 parts of a commercial surface-active additive (BYK 199), 1.5 parts of talc are 3.3 parts of carbon black (Color Black FW171). Then 54 parts of D1 and 3.2 parts of water are slowly metered in. The mixture is dispersed on a bead mill, made up with a 2.5 parts of water, further 5 parts of D1 and 0.3 part of commercial PU thickener (Acrysol RM8), and then filtered. The base paint has a VOC value of 191.8 g/L.

5.3 Red Base Paint

Added with stirring to a mixture of 20.3 parts of D2 and 18 parts of water are 1 part of hydrophobized fumed silica (Aerosil R972) and 18 parts of a red pigment (Bayferrox 160M), and this mixture is supplemented with 29 parts of D1 and 4.5 parts of water and dispersed on a bead mill. The mill base is subsequently made up with 3.7 parts of water, 5 parts of D1 and 0.5 part of a commercial surface-active additive (BYK 345) and finally filtered. This red paste has a VOC of 205 g/L.

5.4 Blue Base Paint 1

Added to a mixture of 23.5 parts of D2 and 10.8 parts of water with vigorous stirring are 0.6 part of a 10% strength N,N'-dimethylethanolamine solution and 8 parts of a blue pigment (Heliogen Blue 6950), and the resulting mixture is subjected to strong shearing for 30 minutes. Subsequently, slowly, 16.4 parts of water and 31 parts of D1 are metered into the vortex and the mixture is dispersed on a bead mill. The mill is flushed with a further 3 parts of water, and 6.7 parts of D1 make-up are added. The blue paste has a VOC of 228.4 g/L.

5.5 Blue Base Paint 2

Added to a mixture of 26 parts of D2, 12 parts of water, and 0.5 parts of butyl glycol, with vigorous stirring, are 9 parts of a blue pigment (Hostaperm Blue BT627-D) and 4 parts of water, and the resulting mixture is dispersed on a bead mill. After the dispersion has been made up with 5.6 parts of water and 42.9 parts of D1, it is filtered. This blue paste has a VOC of 232.4 g/L.

6. Preparation of Inventive Aqueous Coating Materials

The aqueous coating material is formed by mixing of aqueous pigment paste A and optionally pigment paste D, pigment-free component B, and component C.

6.1 Silver Basecoat S1

54.34 g of component B are mixed with 28.93 g of aluminum base paint 1, 12.94 g of blue effect base paint, 3.65 g of green effect base paint, 0.09 g of blue base paint 1, and 0.05 g of red base paint, and the mixture is stirred until homogeneous. It is made up volumetrically with component C in a ratio of 2:1. The aqueous coating material has a VOC of 215 g/L.

6.2 Silver Basecoat S2

56.33 g of component B are mixed with 42.19 g of aluminum base paint 1 and 1.48 g of white effect base paint, and the mixture is stirred until homogeneous. It is made up volumetrically with component C in a ratio of 2:1. The aqueous coating material has a VOC of 217 g/L.

6.3 Silver Basecoat S3:

56.45 g of component B are mixed with 39.61 g of aluminum base paint 2, 33.40 g of aluminum base paint 1, 0.29 g of white base paint, 0.17 g of blue base paint 2, and 0.08 g of black base paint, and the mixture is stirred until homogeneous. It is made up volumetrically with component C in a ratio of 2:1. The aqueous coating material has a VOC of 236 g/L.

7. Storage Stability

The storage of the aqueous pigment paste A at room temperature and 40° C. over 8 weeks shows no changes in composition, flow behavior, and coloristics of the applied dried film.

8. Freeze-Thaw Stability

The freeze-thaw stability was assessed in accordance with the method described above. The results are compiled in table 1.

TABLE 1

| Pigment paste A | | Start | 4 freeze-thaw cycles |
|---|---|---|---|
| Aluminum base paint 1 | pH | 7.95 | 8.01 |
| | Sedimentation | — | no |
| | viscosity (10 s$^{-1}$) | 307 | 247 |
| | viscosity (100 s$^{-1}$) | 152 | 133 |
| | viscosity (1000 s$^{-1}$) | 103 | 96 |
| Aluminum base paint 2 | pH | 7.62 | 7.68 |
| | Sedimentation | — | no |
| | viscosity (10 s$^{-1}$) | 2166 | 2014 |
| | viscosity (100 s$^{-1}$) | 1399 | 1346 |
| | viscosity (1000 s$^{-1}$) | 602 | 588 |

The multiply frozen and thawed aqueous pigment pastes show no notable sedimentation behavior, and the pH as well remains virtually unchanged. Moreover, the change in viscosity even after four freeze-thaw cycles is within the tolerable range. The aqueous pigment pastes used in the mixer system of the invention therefore exhibit good freeze-thaw stability.

9. Evaluation of Weathering Resistance and Stonechip

The condensation sensitivity and the stonechip adhesion were assessed in accordance with methods described above. The results are compiled in tables 2 and 3. For comparison, a commercially available mixer system from BASF Coatings GmbH (Glasurit® 90 Line) is used, to produce the corresponding shades. The VOC contents of the coating materials obtainable with this system (Glasurit® 90 Line) are 312 to 419 g/L.

TABLE 2

| | Constant conditions 240 h (DIN EN ISO 6220-2) | | | | | | | | | |
|---|---|---|---|---|---|---|---|---|---|---|
| | Cross-cut | | | | | | Blistering | | | |
| | before exposure | | 1 h after exposure | | 24 h after exposure | | Amount after 1 h | | Size after 1 h | |
| | EF* | R90 | EF* | R90 | EF* | R90 | EF* | R90 | EF* | R90 |
| Silver S1 | 1 | 1 | 1 | 1 | 1 | 1 | 0 | 0 | 0 | 0 |

*inventive

TABLE 3

| | Multi-impact DIN 20567-1 Rating | | HPT DIN ISO 16925 Rating | |
|---|---|---|---|---|
| | EF* | R90 | EF* | R90 |
| Silver S1 | 2 | 2 | 0 | 1 |

*inventive

From the tables above it is apparent that the aqueous coating materials (EF) produced from the mixer system of the invention have mechanical properties matching those of coating materials (R90), produced using a commercially available mixer system. The aqueous coating materials produced from the mixer system of the invention, however, have a significantly reduced VOC content.

10. Evaluation of Coloristic Qualities

An assessment is made of the shade (angle-dependent lightnesses and flop) in accordance with the methods described above. The results are compiled in table 4. For comparison, a commercially available mixer system from BASF Coatings GmbH (Glasurit® 90 Line) is used, to produce the corresponding shades.

TABLE 4

|  | Flop Index | |
| --- | --- | --- |
|  | Silver S2 | Silver S3 |
| R90 | 15.4 | 11.3 |
| EF* | 15.8 | 10.8 |

*inventive

In spite of the different mode of finishing, without intermediate flashing and passivation of the aluminum flakes, it is possible in the context of metallic shades to achieve a very good metallic effect, which is virtually identical to the system (R90) available commercially.

The invention claimed is:

1. A mixer system for producing aqueous coating materials, comprising
   (a) at least one aqueous pigment paste A comprising at least one effect pigment (a-1) and also at least one anionically stabilized binder (a-2) and/or at least one nonionically stabilized binder (a-3), and
   (b) at least one pigment-free component B comprising at least one acrylate-based microgel dispersion (b-1), the acrylate-based microgel having a glass transition temperature $T_g$ of 50 to 60° C.,
   wherein the aqueous pigment paste A and the pigment-free component B each have a VOC value of less than or equal to 250 g/L.

2. The mixer system as claimed in claim 1, wherein the anionically stabilized binder (a-2) of the pigment paste A is an anionically stabilized polyurethane polymer in dispersion in water, where the anionically stabilized polyurethane polymer has an acid number of 20 to 40 mg KOH/g, based on the solids content, where the dispersion has a pH of 7.0 to 8.0, and where the dispersion comprises a polyol, having an average molar mass of 500 to 1500 Da.

3. The mixer system as claimed in claim 1, wherein the nonionically stabilized binder (a-3) of the pigment paste A is a nonionically stabilized acrylate copolymer in dispersion in water, the nonionically stabilized acrylate copolymer being obtainable by reaction of
   (I) at least one anchor group monomer unit having at least one ionizable functional group, a functional group with active hydrogen, or a combination thereof, wherein
      the ionizable functionality is other than a carboxylic acid group in which the carbonyl carbon is separated from the closest ethylenically unsaturated carbon by at least four atoms,
      the anchor group of monomer units (a) contain no polyoxyalkylene groups, and
      one of the anchor group monomer units is copolymerized 1-(2- methacryloyloxyethyl)-2-imidazolidinone;
   (II) 5 wt % to 45 wt %, based on the total weight of the monomers, of at least one monomer unit comprising a polyoxyalkylene group, a gamma-hydroxycarbamate group, a beta-hydroxycarbamate group, and a combination thereof; and
   (III) 1 to 50 weight percent, based on the total weight of the monomers, of at least one aromatic monomer unit.

4. The mixer system as claimed in claim 1, wherein the at least one pigment paste A has a weight ratio of the total amount of nonionically stabilized binder (a-3) to the total amount of anionically stabilized binder (a-2) of 1:5 to 1:36, based on the solids content.

5. The mixer system as claimed in claim 1, wherein the at least one pigment paste A comprises organic solvent in a total amount of 0 to 10 wt %, based on the total weight of the aqueous pigment paste A.

6. The mixer system as claimed in claim 1, wherein the acrylate-based microgel dispersion (b-1) has a gel fraction of 80% to 100%, based on the solids content of the dispersion.

7. The mixer system as claimed in claim 1, wherein the acrylate-based microgel dispersion (b-1) is obtainable by a radical emulsion polymerization, of
   (i) 60 to 70 wt %, based on the total weight of the monomers (i) and (ii), of a first monomer which contains at least two alkenyl groups, and
   (ii) a mixture of 10 to 90 w t% of $C_1$-$C_{10}$ hydroxyalkyl (meth)acrylate, and 10 to 90 wt %, based in each case on the total weight of the monomers (i) and (ii), of $C_1$-$C_{10}$ alkyl (meth)acrylate.

8. The mixer system as claimed in claim 1, wherein the pigment-free component B comprises the acrylate-based microgel dispersion (b-1) in a total amount of 4 to 25 wt %, based on the total weight of the pigment-free component B.

9. The mixer system as claimed in claim 1, wherein the at least one pigment-free component B further comprises an anionically stabilized binder (b-2b), wherein the anionically stabilized binder (b-2b) comprises at least one anionically stabilized polymer in dispersion in water and has a particle size of 100 to 500 nm, wherein the preparation of the polymer comprises the successive radical emulsion polymerization of three mixtures (A), (B), and (C) of olefinically unsaturated monomers, wherein
   the mixture (A) comprises at least 50 wt % of vinylaromatic monomers, and a polymer prepared from the mixture (A) possesses a glass transition temperature of 10 to 65° C.,
   the mixture (B) comprises at least one polyunsaturated monomer, and a polymer prepared from the mixture (B) possesses a glass transition temperature at −35 to 15° C., and
   the mixture (C) comprises at least one anionic monomer, and a polymer prepared from the mixture (C) possesses a glass transition temperature of −50 to 15° C.,
   and wherein
   i. first the mixture (A) is polymerized,
   ii. then the mixture (B) is polymerized in the presence of the polymer prepared under i., and
   iii. thereafter the mixture (C) is polymerized in the presence of the polymer prepared under ii.

10. The mixer system as claimed in claim 1, wherein the at least one pigment-free component B comprises organic solvent in a total amount of 0 to 8 wt %, based on the total weight of the component B.

11. The mixer system as claimed in claim 1, wherein the aqueous pigment paste A and the pigment-free component B each have a VOC content of 0 to 250 g/L.

12. The mixer system as claimed in claim 1, wherein the mixer system further comprises a component C, the component C comprising at least one thickener and also 90 to 98 wt % of water, based on the total weight of component C.

13. A method for producing aqueous coating materials having a VOC content of 0 to 250 g/L, by mixing at least two aqueous components, wherein the mixer system as claimed in claim 1 is used and the aqueous coating materials are produced by mixing the pigment paste A with the pigment-free component B and, optionally, with the component C.

14. The method as claimed in claim 13, wherein the aqueous coating material comprises organic solvents in a total amount of 0 to 7 wt %, based on the total weight of the coating material.

15. A method of using the mixer system as claimed in claim 1, the method comprising using the mixer system for producing aqueous coating materials for refinishing and/or for the coating of automobile bodies and/or plastics parts.

16. The mixer system as claimed in claim 1, wherein the at least one pigment paste A comprises organic solvent in a total amount of 0 to 9.5 wt %, based on the total weight of the aqueous pigment paste A.

17. The mixer system as claimed in claim 1, wherein the acrylate-based microgel dispersion (b-1) has a gel fraction of 85% to 100%, based on the solids content of the dispersions.

18. The mixer system as claimed in claim 1, wherein the acrylate-based microgel dispersion (b-1) has a gel fraction of 88% to 98%, based on the solids content of the dispersions.

19. The mixer system as claimed in claim 1, wherein the pigment-free component B comprises the acrylate-based microgel dispersion (b-1) in a total amount of 6 to 20 wt %, based on the total weight of the pigment-free component B.

20. The mixer system as claimed in claim 1, wherein the at least one pigment-free component B comprises organic solvent in a total amount of 0 to 7.5 wt %, based on the total weight of the component B.

* * * * *